US011126200B2

(12) United States Patent
Gaal et al.

(10) Patent No.: US 11,126,200 B2
(45) Date of Patent: Sep. 21, 2021

(54) METHOD, APPARATUS, AND SYSTEM FOR PROVIDING AN INTERFACE FOR PUBLISHING SENSOR DATA REQUESTS IN CAMPAIGN MANAGEMENT PLATFORM

(71) Applicant: HERE GLOBAL B.V., Eindhoven (NL)

(72) Inventors: Zoltan Gaal, Chicago, IL (US); Dennis Scott Williamson, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 278 days.

(21) Appl. No.: 16/276,248

(22) Filed: Feb. 14, 2019

(65) Prior Publication Data

US 2020/0264628 A1    Aug. 20, 2020

(51) Int. Cl.
```
G05D 1/02      (2020.01)
G06F 3/0481    (2013.01)
G01C 21/36     (2006.01)
G06Q 50/30     (2012.01)
H04L 29/08     (2006.01)
G01C 21/32     (2006.01)
```

(52) U.S. Cl.
CPC ......... *G05D 1/0276* (2013.01); *G06F 3/0481* (2013.01); *G01C 21/367* (2013.01); *G05D 2201/0213* (2013.01)

(58) Field of Classification Search
USPC .......................................................... 701/24
See application file for complete search history.

(56) References Cited

U.S. PATENT DOCUMENTS

| 6,230,098 B1 | 5/2001 | Ando et al. |
| 8,112,219 B2 | 2/2012 | Johnson et al. |
| 9,430,944 B2 | 8/2016 | Grimm et al. |

(Continued)

FOREIGN PATENT DOCUMENTS

EP    3130891 B1    2/2017

OTHER PUBLICATIONS

Olson et al., "Exploration and Mapping with Autonomous Robot Teams Results from the Magic 2010 Competition", doi:10.1145/2428556.2428574, Communications of the ACM, Mar. 2013, vol. 56, No. 3, pp. 62-70.

(Continued)

*Primary Examiner* — Tyler D Paige
(74) *Attorney, Agent, or Firm* — Ditthavong, Steiner, & Mlotkowski

(57) ABSTRACT

An approach is provided for creating an interface for a campaign management platform to transmit a sensor data request for digital map data. The approach, for example, involves retrieving, by the campaign management platform, the sensor data request specifying a sensor data collection event to be performed on a road segment, a geographic area, or a combination thereof. The approach involves publishing the sensor data request to the interface. The interface comprises a plurality of layers including an active request layer, a newly published request layer, a revoked request layer, or a combination thereof. A plurality of vehicles, a manufacturer platform associated with the plurality of vehicles, or a combination thereof accesses at least one of the plurality of layers to fulfill the sensor data request. The publishing, for example, can be performed according to publishing time cadence or period.

20 Claims, 17 Drawing Sheets

(56) References Cited

U.S. PATENT DOCUMENTS

| | | | |
|---|---|---|---|
| 9,672,739 | B2 | 6/2017 | Onozawa et al. |
| 10,002,531 | B2 | 6/2018 | Lynch |
| 2009/0138497 | A1 | 5/2009 | Zavoli et al. |
| 2015/0279125 | A1 | 10/2015 | Chronowski et al. |
| 2018/0005527 | A1* | 1/2018 | Bostick ................ G08G 1/0141 |
| 2018/0188037 | A1* | 7/2018 | Wheeler ................ H04L 67/12 |
| 2018/0188044 | A1 | 7/2018 | Wheeler |
| 2018/0224285 | A1 | 8/2018 | Stajner et al. |
| 2018/0247160 | A1* | 8/2018 | Rohani ................ G05D 1/0088 |
| 2018/0335307 | A1 | 11/2018 | Chen et al. |
| 2019/0277643 | A1* | 9/2019 | Szubbocsev ...... B60W 60/0016 |
| 2019/0294173 | A1* | 9/2019 | Szubbocsev ........ B60L 15/2045 |
| 2019/0304097 | A1* | 10/2019 | Eade .................... G06F 16/284 |

OTHER PUBLICATIONS

"The Mapping Challenge", Published in Road Experience Management (REM), retrieved on Oct. 25, 2018, from https://www.mobileye.com/our-technology/rem/, pp. 1-4.
Office Action for corresponding European Patent Application No. 20155162.9-1222, dated Apr. 14, 2020, 10 pages.
Hodgson, "The Future of Maps: Technologies, Processes, and Ecosystem", Dec. 24, 2018, 12 pages.
Office Action for related European Patent Application No. 20 155 162.9-1222, dated Jul. 1, 2021, 9 pages.

\* cited by examiner

METHOD, APPARATUS, AND SYSTEM FOR PROVIDING AN INTERFACE FOR PUBLISHING SENSOR DATA REQUESTS IN CAMPAIGN MANAGEMENT PLATFORM

BACKGROUND

Providing high quality digital map data for vehicle safety, particularly in autonomous driving, has been a primary concern for automobile manufacturers and related service providers. For example, having data on where road segments and related features (e.g., signs, poles, road markings, etc.) are and what might be coming up ahead in a road network can enable autonomous and/or other vehicles to safely navigate. However, maintaining such high quality and up-to-date map data can consume considerable amounts of computing and network resources. For example, crowdsourcing sensor data that is used to generate or maintain digital map data can consume large amounts of costly network bandwidth (e.g., cellular network bandwidth). Accordingly, service providers face significant technical challenges to more efficiently generate and maintain digital map data, particularly when using crowdsourced sensor data transmitted from consumer vehicles.

SOME EXAMPLE EMBODIMENTS

Therefore, there is a need for a campaign management platform to coordinate map data validation, discovery, and/or update campaigns so that they direct sensor data requests to targeted vehicles to advantageously reduce resources needed to transmit and or process the sensor data collective through such campaigns.

According to one embodiment, a method for providing an interface for publishing sensor data requests in a campaign management platform comprises retrieving, by the campaign management platform, the sensor data request specifying a sensor data collection event to be performed on a road segment, a geographic area, or a combination thereof. The method also comprises publishing the sensor data request to the interface. The interface comprises a plurality of layers including an active request layer, a newly published request layer, a revoked request layer, or a combination thereof. A plurality of vehicles, a manufacturer platform associated with the plurality of vehicles, or a combination thereof accesses at least one of the plurality of layers to fulfill the sensor data request.

According to another embodiment, an apparatus for providing an interface for publishing sensor data requests in a campaign management platform comprises at least one processor, and at least one memory including computer program code for one or more computer programs, the at least one memory and the computer program code configured to, with the at least one processor, cause, at least in part, the apparatus to retrieve, by the campaign management platform, the sensor data request specifying a sensor data collection event to be performed on a road segment, a geographic area, or a combination thereof. The apparatus is also caused to publish the sensor data request to the interface. The interface comprises a plurality of layers including an active request layer, a newly published request layer, a revoked request layer, or a combination thereof. A plurality of vehicles, a manufacturer platform associated with the plurality of vehicles, or a combination thereof accesses at least one of the plurality of layers to fulfill the sensor data request.

According to another embodiment, a non-transitory computer-readable storage medium for providing an interface for publishing sensor data requests in a campaign management platform carries one or more sequences of one or more instructions which, when executed by one or more processors, cause, at least in part, an apparatus to retrieve, by the campaign management platform, the sensor data request specifying a sensor data collection event to be performed on a road segment, a geographic area, or a combination thereof. The apparatus is also caused to publish the sensor data request to the interface. The interface comprises a plurality of layers including an active request layer, a newly published request layer, a revoked request layer, or a combination thereof. A plurality of vehicles, a manufacturer platform associated with the plurality of vehicles, or a combination thereof accesses at least one of the plurality of layers to fulfill the sensor data request.

According to another embodiment, an apparatus for providing an interface for publishing sensor data requests in a campaign management platform comprises means for retrieving, by the campaign management platform, the sensor data request specifying a sensor data collection event to be performed on a road segment, a geographic area, or a combination thereof The apparatus also comprises means for publishing the sensor data request to the interface. The interface comprises a plurality of layers including an active request layer, a newly published request layer, a revoked request layer, or a combination thereof. A plurality of vehicles, a manufacturer platform associated with the plurality of vehicles, or a combination thereof accesses at least one of the plurality of layers to fulfill the sensor data request.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for using a campaign management platform 101 to validate map data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
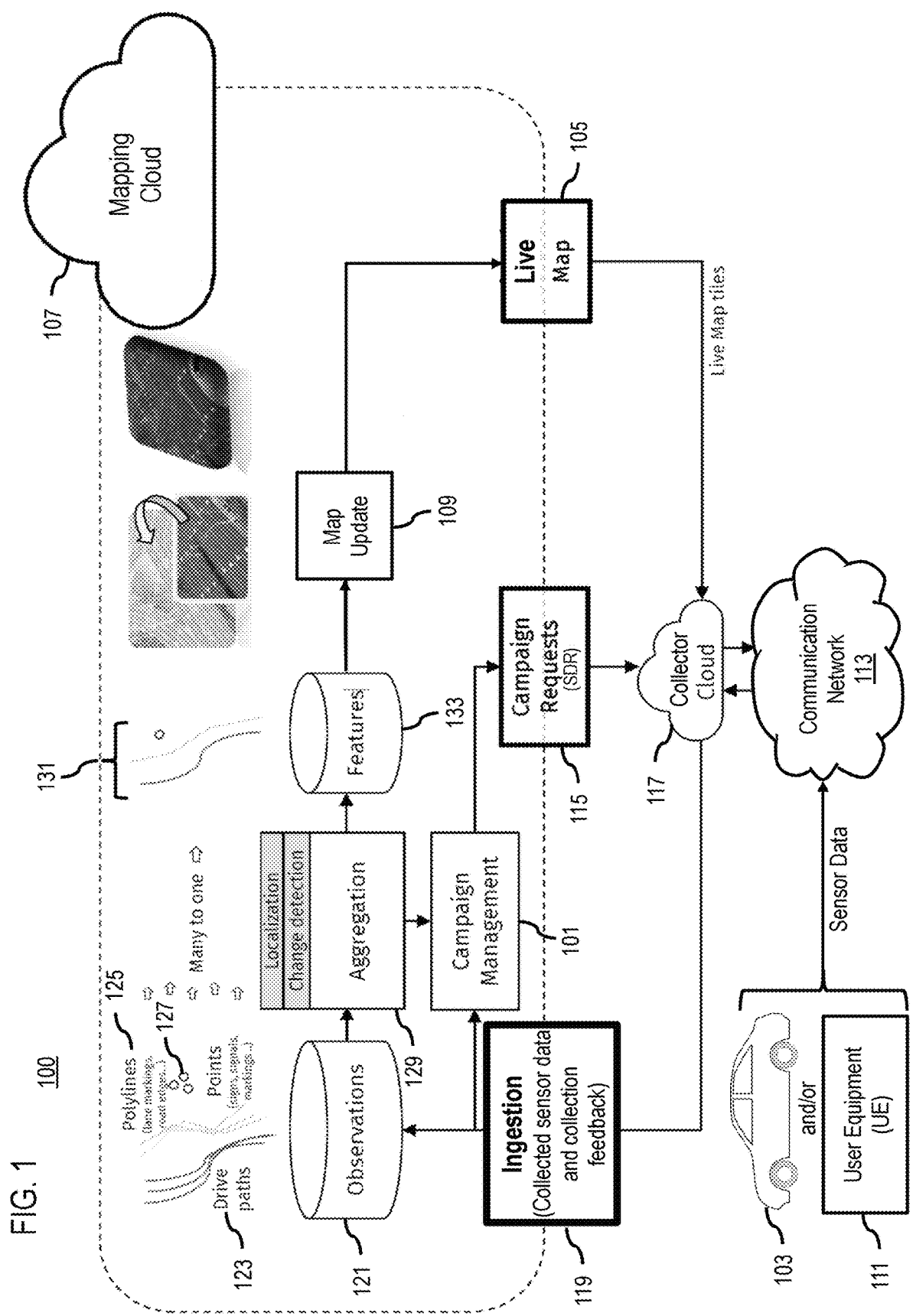
FIG. 1 is a diagram of a system capable of using a campaign management platform to validate, discover, or update map data, according to one embodiment.

FIG. 1 is a diagram of a system capable of using a campaign management platform to validate, discover, or update map data, according to one embodiment. Vehicles (e.g., vehicle 103) will soon be making driving decisions without human intervention. In order to support those decisions, autonomous vehicles 103 need reliable map information to assist them in various situations, such as but not limited to knowing road layouts, what obstructions may lie ahead, and updates about local traffic laws. Map data (e.g., stored in a live map 105, e.g, a geographic database) is an important and indispensable source of guidance for autonomous vehicles, so this map data needs to be correct, accurate, and up to date to provide accurate representation of the world or environment in which the vehicle operates.

However, the world is not static. It is constantly shifting and evolving. Mapping systems (e.g., a cloud-based mapping platform 107) that support autonomous driving (or other driving use cases relying on up to date map data) must therefore constantly detect, verify, and update the changes that are happening in the world, in near real-time, and make appropriate updates to the digital map data of live map 105). One way for the mapping platform 107 to obtain this level of freshness is to crowdsource data from sensors installed on vehicle fleets (e.g., vehicles 103) and/or mobile devices associated with the vehicles 103 (e.g., a user equipment (UE) devices 111) in order to adapt and match to the constantly changing environment. In other words, the live map 105 or the digital map data stored therein needs an ability to "self-heal" by filling in map data for newly discovered areas, validating map data in existing areas, and/or updating previously generated map data as needed.

In one embodiment, the fuel for the self-healing of the digital map data of the live map 105 can be derived from sensors onboard vehicles 103 and/or UEs 111, particularly when the digital map data includes high-definition (HD) map data with sub-meter or better accuracy along with live (e.g., real-time or substantially real-time) data on related contextual parameters (e.g., traffic, incidents, road conditions, weather, etc.). For example, consumer vehicles 103 and/or UEs 111 traveling in a road network can collect sensor data (e.g., vehicle pose path or trajectory data, image data, LiDAR data, etc.) about a road segment or the surrounding area and then transmit the collected data over a communication network 113 (e.g., a cellular data network) to the mapping platform 107 for processing.

However, over the air bandwidth and transmission costs remain a major concern, particularly for original equipment manufacturers (OEMs), i.e., automobile manufacturers, vehicle owners, and/or the mapping service providers who may bear the costs for such transmissions. For example, the constant creation and transmission of large volume of sensor data over the air from a large vehicle fleet would likely be outside of normal budget considerations. As a result, mapping service providers face significant technical challenges to providing a strategy and technical solution for minimizing the necessary bandwidth and subsequent costs of discovering, validating, and/or update map data.

To address these technical challenges, a system 100 of FIG. 1 introduces a capability to manage data transmission volumes for collecting vehicle sensor data for digital map making using the campaign management platform 101. In one embodiment, campaign or sensor data requests (SDRs) 115 for sensor data will be created and managed by the campaign management platform 101, which can reside in the cloud as a server-side component. The campaign management platform 101 can be a part of the overall cloud-based mapping platform 107 or operate as a standalone component or a component of any other system/platform. In one embodiment, the campaign management platform 101 can determine the need for sensor data for any given geographic extent or road segment, based on a number of considerations, including map data age, refresh history, and/or new road discovery, among others. Vehicles 103 will not transmit sensor data to the cloud except in response to a sensor data request (SDR) 115 by the campaign management platform 101. By way of example, the cloud includes any server-side component of the system 100 including, but not limited, to a collector cloud platform 117 (e.g., responsible for fulfilling SDRs by collecting data from vehicles 103 and/or UEs 111), the campaign management platform 101, and/or the mapping platform 107. In one embodiment, these sensor data requests 115 will be sent using a designated Sensor Data Request Interface format (SDRI) (e.g., discussed in more detail below) or equivalent format. By implementing a globally aware intelligence in the cloud, e.g., via the campaign management platform 101, the campaign management platform 101 can advantageously optimize the creation and transmission of only that sensor data which is needed by a map learning pipeline of the mapping platform 107 to properly maintain the map.

In one embodiment, the campaign management platform 101 can produce sensor data requests (e.g., data collection jobs) following three distinct models: "Validation", "Discovery", and "Update". Generally, sensor data requests generated by the campaign management platform 101 will request data collection within a specified, spatially limited geo-extent (e.g., designated road segments or geographic areas). In one embodiment, these geo-extent can also be buffered by a designated distance threshold, within which vehicle sensor data will also be performed. In this way, the campaign management platform 101 can include a margin to ensure as complete coverage of the designated geo-extent as possible. For example, data collection will be initiated as a vehicle 103 that receives the sensor data request enters the buffer region and ends after the vehicle 103 leaves the buffer region.

In one embodiment, the validation model for requesting or producing sensor data for digital map making comprises requesting sensor data from a relatively few number of vehicles 103 on the road network to validate the accuracy or freshness of the known or previously mapped geographic areas or road segments. The validation can include, for instance, performing a change detection to determine whether any previously known map features have change. In one embodiment, change detection uses collected sensor data to identify when a map feature has moved or changed its location, is new to the monitored area, or is missing in the sensor data. The discovery model for requesting or producing sensor data comprises requesting sensor data from a vehicle 103 that is traveling off the known road network to discover new or previously unmapped road networks. The update model for requesting or producing sensor data comprises requesting additional data as needed to update digital map. By way of example, this need can be triggered based on detecting a change during the map data validation or based on discovering a new or previously unmapped area or road segment during map data discovery.

In summary, via the capabilities and programmed intelligence/logic of the campaign management platform, vehicles 103 participating in sensor data collection for digital map making will not need to send a constant stream of data to the cloud. Instead, the vehicles 103 will be asked to collect sensor data only on specific roads or under specific conditions, for specific needs (e.g., map validation, map discovery, and/or map update) determined by the campaign management platform 101. In one embodiment, the collector cloud 117 can collect the sensor data and/or collection feedback from the vehicles 103 and/or UEs 111 to fulfill sensor data requests from requesting entities such as the mapping cloud 107, campaign management platform 101, and/or any other data requestor.

In one embodiment, campaign management platform 101 generates or receives input for creating campaigns to collect sensor data to the meet the specific needs (e.g., map validation campaign, map discovery campaign, and/or map update campaign). For example, a campaign is a commitment by a fleet of vehicles 103 to collect sensor data in order to create or maintain digital map data in an area for a length of time. Sensor data refers to observations made by fleet vehicles 103 using, for instance, map feature detections determined for fused sensor data from one or more vehicle sensors. The sensor data resulting from these campaigns can be fed into a map learning pipeline comprising, for instance, an ingestion module 119 for aggregating sensor data and collection feedback received in response to active sensor data requests transmitted from the campaign management platform 101 (e.g., ingested from responses to SDRI requests or requests via a sensor data ingestion interface (SDII) or equivalent).

The ingestion module 119 can store the receive sensor data observations in an observations database 121 or equivalent data store or forward the sensor data directly to the campaign management platform 101 (e.g., to evaluate whether a campaign is complete or whether more data is needed). Examples of the sensor data observations can include but are not limited to:

(1) Vehicle drive or pose paths 123 comprising a time-ordered sequence to probe or location points (e.g., GPS location points) with each location point specifying a time-stamped location and heading (e.g., pose) of the collecting vehicle 103;

(2) Polylines 125 representing detected lane markings, road edges, and/or any other linear map feature; and (3) Points 127 represented detected signs, signals, poles, markings, and/or any other map feature that can be represented using a point location.

In some cases, the observations in the observations database 121 can include multiple observations of the same map feature. Accordingly, an aggregation module can aggregate the multiple observations (e.g., cluster based on distance or other clustering means) to covert the many observations to one corresponding observation 131 for different map feature to store in the features database 133. In addition, the aggregation module can localize the observations against the digital map data of the live map 105 to perform change detection. Based on any detected changes, the aggregation module 129 can signal the campaign management platform 101 to initiate additional campaigns (e.g., initiate an update campaign if a map feature has changed or been newly detected).

The map learning pipeline then continues by converting any new or updated map features stored in the features database 133 into a map update 109 package to update the digital map data of the live map 105. In one embodiment, the live map 105 is compiled from data streams of digital map data in a standard format (e.g., Navigation Data Standard (NDS) format or equivalent) along with data streams of real-time and/or substantially real-time data (e.g., live map data). To complete the mapping pipeline the published live map 105 can then be made available to the end user (e.g., vehicle 103 and UE 111) directly or via the OEM platform 117 over the communication network 113 or other downloaded media.

Figure 2:
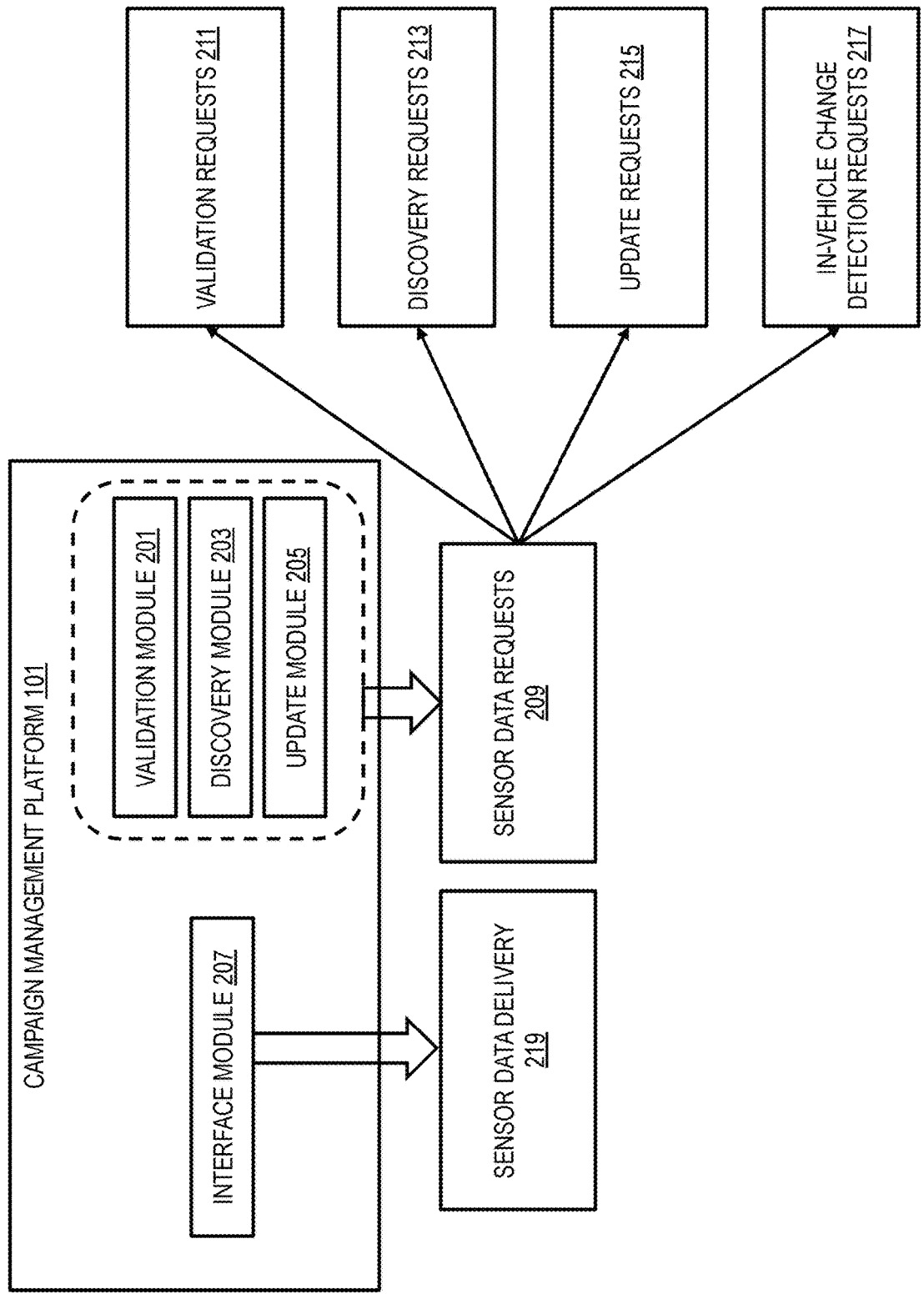
FIG. 2 is a diagram illustrating an examples sensor data requests that can be generated by a campaign management platform, according to one embodiment.

In one embodiment, as shown in FIG. 2, the campaign management platform 101 includes one or more components for creating or maintain digital map data, according to the various embodiments described herein. It is contemplated that the functions of these components may be combined or performed by other components of equivalent functionality. In this embodiment, the campaign management platform 101 includes a validation module 201 for performing functions related to map validation campaigns (e.g., validate known digital map data), a discovery module 203 for performing functions related to map discovery campaigns (e.g., generate new digital map data), and an update module 205 for performing functions related to map update campaigns (e.g., update known digital map data), and a sensor data request interface (SDRI) 207 for transmitting or publishing sensor data requests 209 to vehicles 103 and/or UEs 111 via sensor data delivery 219 (e.g., through the collector cloud 117). In one embodiment, the sensor data requests 209 are requests to collect sensor data, and can be highly filtered based on a geofence, designated date and/or time, and/or any other restrictions or vehicle qualifiers (e.g., windshield wipers off/on, headlights off/on, etc.). As shown, the sensor data requests 209 can have additional subtypes including but not limited to validation requests 211, discovery requests 213, update requests 215, and/or in-vehicle change detection requests 217.

The above presented modules and components of the mapping platform 111 can be implemented in hardware, firmware, software, or a combination thereof. Although depicted as a component of the mapping platform 107 in FIG. 1, it is contemplated that the campaign management platform 101 may be implemented as a standalone entity or as a module of any other component of the system 100. In another embodiment, one or more of the campaign management platform 101 and/or any of the modules 201-207 may be implemented as a cloud-based service, local service, native application, or combination thereof. The map validation, discovery, update, and interface functions of the campaign management platform 101 and the modules 201-207 are discussed with respect to FIGS. 3-14 below.

Figure 3:
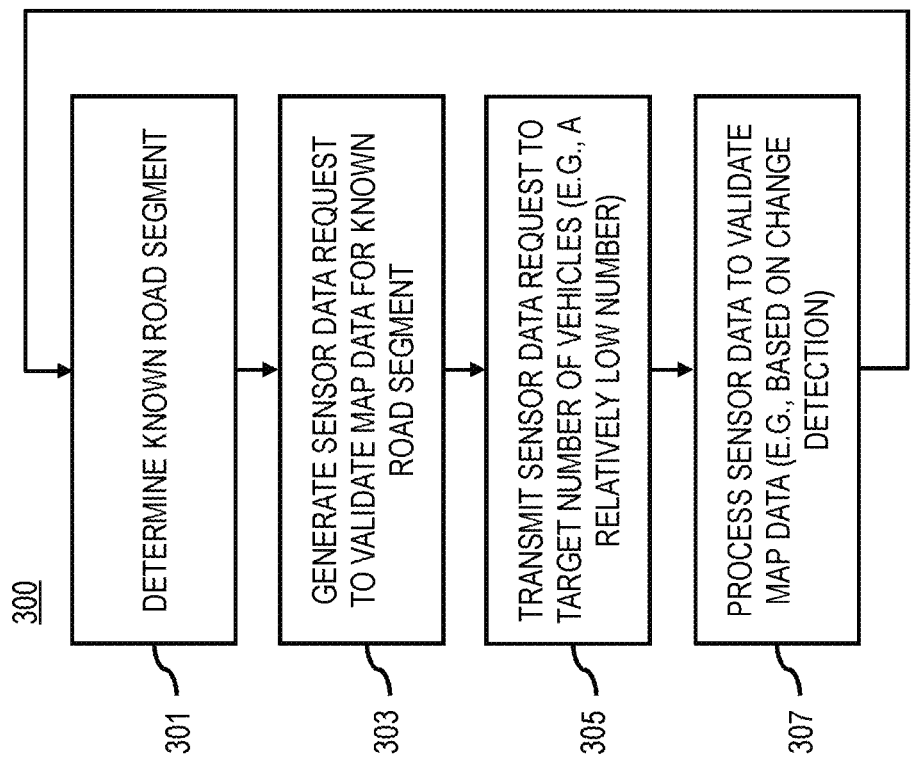
FIG. 3 is a flowchart of a process for using a campaign management platform to validate digital map data, according to one embodiment.
Figure 15:
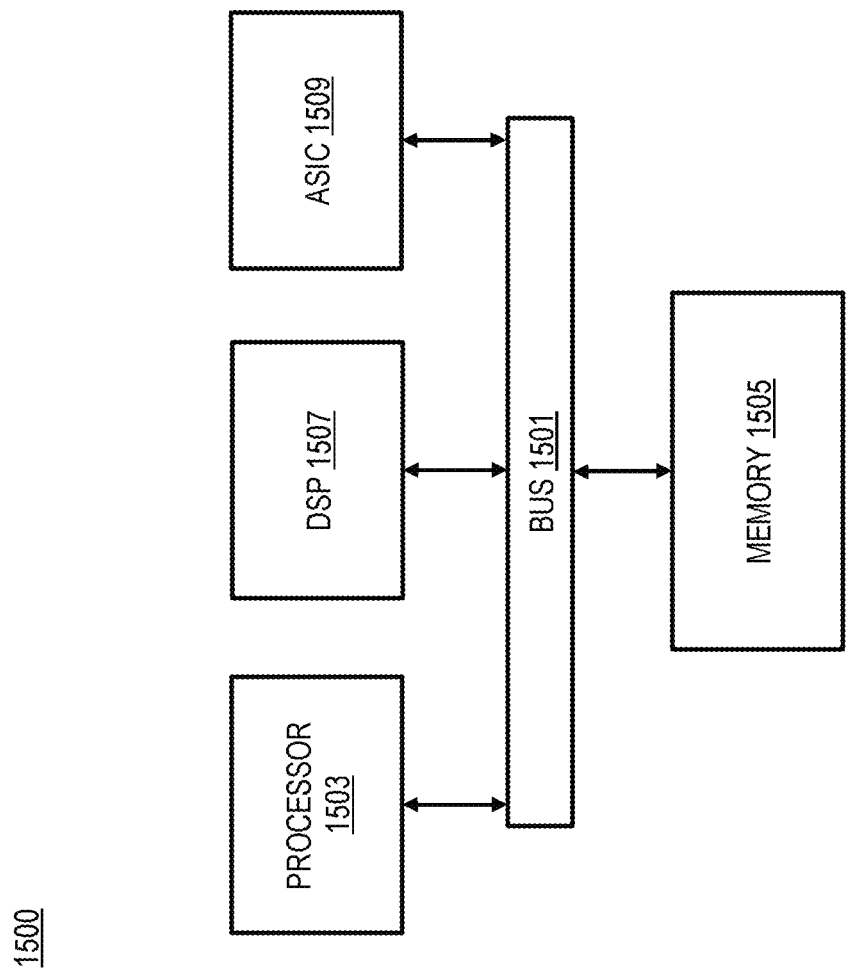
FIG. 15 is a diagram of a chip set that can be used to implement an embodiment.

FIG. 3 is a flowchart of a process for using a campaign management platform to validate digital map data, according to one embodiment. In various embodiments, the campaign management platform 101 and/or any of the modules 201-207 may perform one or more portions of the process 300 and may be implemented in, for instance, a chip set including a processor and a memory as shown in FIG. 15. As such, the campaign management platform 101 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the process 300 provides for a "validation" model of the campaign management platform 101 that can be used to validate existing or known map data of the live map 105. It is contemplated that map validation process 300 can be used as a standalone process or in combination with the "discovery" model and/or "update" model.

In one embodiment, the map validation process 300 can be summarized as follows. The validation module 201 can generate validation requests (e.g., sensor data requests to collect sensor data for map validation) on a scheduled interval. These requests, for instance, will be for data of a known roadway corridor or geographic area. Typically, validation requests will only require a relatively small number of independent collection events. This is because, validation sensor data collection events are not intended to produce map updates, but instead to inform the map data change detection process. In one embodiment, for vehicles 103 or UEs 111 that have local copies of the digital map data onboard (e.g., published instances of the live map 105), change detection may happen in-vehicle. For vehicles 103 that do not have the live map 105 onboard, change detection process can occur in the cloud. Once changes have been confirmed to exist within the map validation campaign area, the campaign management platform 101 can launch an "update" campaign in order to acquire the data needed by the map learning pipeline of the mapping platform 107 to update the existing digital map data for the road corridor or area.

Referring to FIG. 3, to initiate the validation process 300, in step 301, the validation module 201 determines a road segment that has been previously mapped (e.g., has an associated geographical data record stored in the live map 105). For example, the validation module 201 can query the live map 105 for validation intervals associated with one or more road corridors or geographic areas of interest. The validation module 201 can then select the road corridors (e.g., a road segment and surrounding area within a threshold distance of the road segment) or geographic areas whose known digital map data are to be validated. In other words, the validation process 300 can select the road segment or geographic area to validate based on a data freshness threshold. The data freshness threshold can be based on a refresh schedule (e.g., validation interval) for a geographic area in which the road segment is located. In addition or alternatively, the data freshness threshold can be based on an age of the digital map data, a refresh history of the digital map data, or a combination thereof. For example, a validation request for the road corridor or area can be triggered when the recorded age of the digital map data reaches a maximum age. In addition, if the refresh history indicates that the map data for a particular road corridor or area occurs a certain frequency, that frequency can be used as the validation interval to trigger validation requests.

In step 303, the validation module 201 generates a sensor data request specifying a sensor data collection event to be performed on the road segment. As previously noted, the sensor data collection event can be part of a campaign to validate the digital map data for the road segment, a geographic area including the road segment, or a combination thereof. In one embodiment, the validation request can specify any combination of elements including but not limited to:

(1) The road corridor or geographic area to validate, e.g., specified using a polygon, map tile, or other bounding area including any applicable buffer area or margin;
(2) Sensor data types to collect including but not limited to sensor data indicating detected road segments, lane markings, signs, poles, road furniture, etc.
(3) A data range for the sensor data collection event (e.g., dates for which the sensor data request is active);
(4) A time range for the sensor data collection event (e.g., a time range for which the sensor data request is valid);
(5) A target number of participating vehicles 103; and
(6) One or more vehicle qualifiers specifying conditions that are to be met by participating vehicles 103 before collecting and/or transmitting sensor data in response to the request (e.g., qualifiers such as but not limited to the vehicle's wipers being off, headlights off, etc.).

Figure 4A:
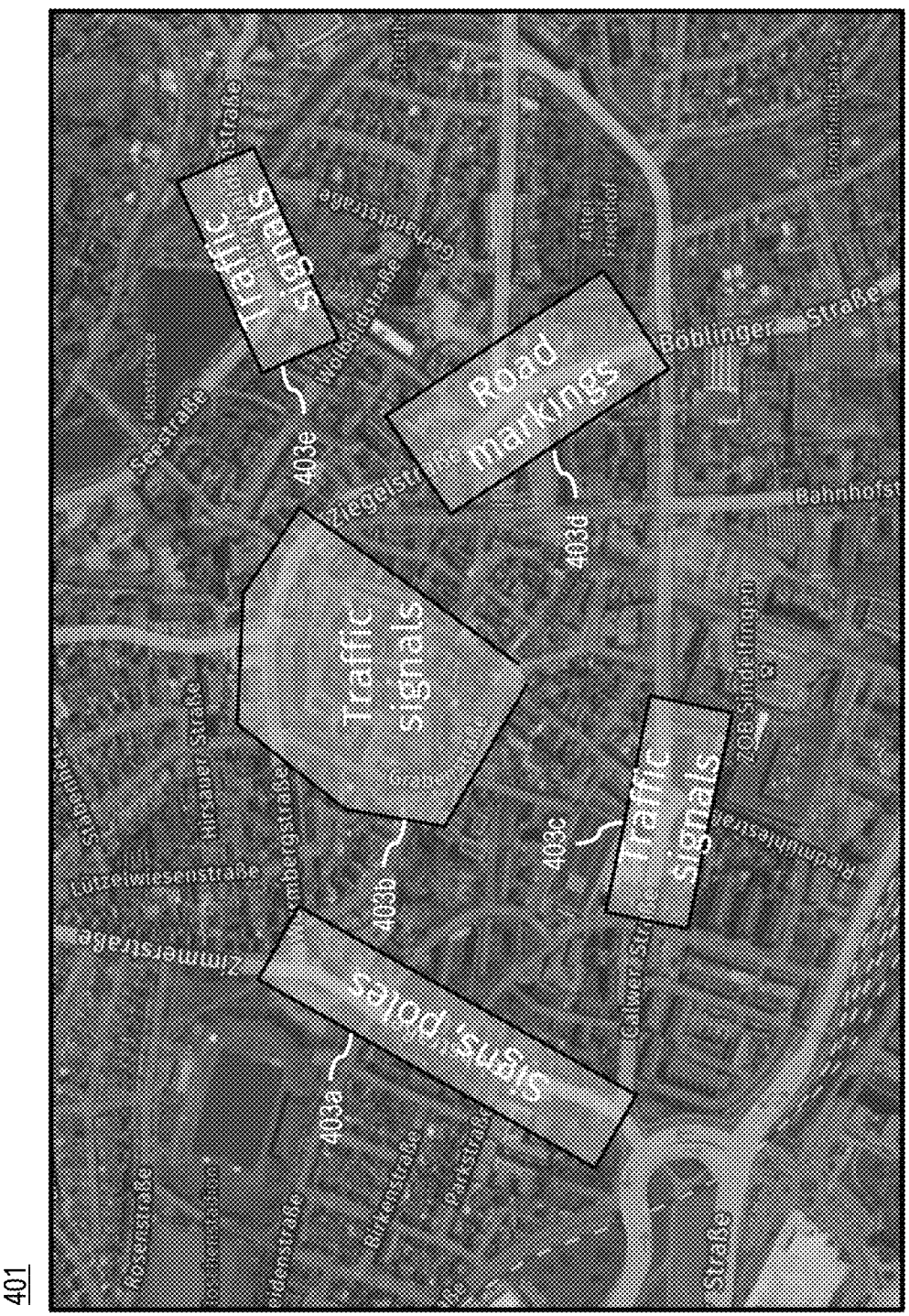
FIG. 4A is a diagram illustrating an example user interface for visualizing sensor data requests as the boundaries of the target areas, according to one embodiment.

FIG. 4A is a diagram illustrating an example user interface (UI) 401 for visualizing sensor data requests, according to one embodiment. In the example of FIG. 4A, the UI 401 presents a map on which representations of sensor data requests 403a-404e (also collectively referred to as sensor data requests 403) are overlaid. Each of the sensor data requests are represented with polygons representing their active areas for collecting sensor data. In addition, each of the representations of the sensor data requests indicates the sensor data types that are to be collected. For example, sensor data request 403a is for collecting sensor data to validate map data for signs and poles, sensor data requests 403b, 403c, and 403e are for collecting sensor data to validate map data for traffic signals, and sensor data request 403d is for collecting sensor data to validate map data for road markings.

Returning to FIG. 3, in step 305, the validation module 201 transmits or issues the generated sensor data request to the target number of vehicles 103. The target number of vehicles 103 receiving the request can then perform the sensor data collection event on the designated road segment or geographic area to collect sensor data. In one embodiment, the campaign limits a use of data network bandwidth to a transmission of the sensor data from the target number of vehicles in response to the sensor data request. In this way, the campaign management platform 101 can reduce the data transmission costs and required network bandwidth to advantageously provide for improved efficiency.

In one embodiment, the target number of vehicles is determined based on a minimum number of vehicles that can provide the sensor data within a data freshness threshold (indicated by a refresh interval or specified date/time range in the request). In other words, the campaign management platform 101 calculate the minimum number of vehicles based on traffic volume in the area, historical data collection events, or equivalent.

In step 307, the validation module 201 processes the sensor data to validate the digital map data for the road segment. For example, as part of the validation process, the validation module 201 can initiate a processing of the sensor data to perform a change detection with respect the digital map data. In one embodiment, change detection can include determining whether a known map feature has moved or is missing, or a new or previously unmapped feature has been detected. To determine whether a feature has moved, the validation module 201 processes the sensor data to localize detections of the known feature. If the localized geo-coordinates of the detected known feature are more than a threshold distance (e.g., beyond an accuracy threshold of the corresponding sensors or other designated threshold value) from the recorded known location in the digital map data, then the validation module 201 can determine that the feature has moved. In other words, the measured deviation of the detected/observed feature from its known location represented in the digital map data exceeds an accuracy criterion. To determine that a feature is new, the validation module 201 can determine that an observed feature in the sensor data does not associate with any known feature of the digital map data. To determine that a known feature is missing, the validation module 201 can determine that the sensor data does not indicate that the feature is mapped in the digital map data but is nonetheless not present in the collected sensor data.

In one embodiment, the change detection can be determined in the cloud (e.g., by the campaign management platform 101 and/or the mapping platform 107). In one embodiment, the change detection can be performed in the cloud based on determining that a reporting vehicle 103 or UE 111 does not have an instance of the HD live map 137 onboard. For cloud-based change detection, the campaign management platform 101, for instance, can perform a continuous validation campaign (or a discovery campaign as discussed below) to collect sensor data for a road network (e.g., on or off the road network). As noted, the campaigns can use a relatively low number of participating vehicles 103 only as frequently as needed to ensure data freshness. The received sensor data is localized and compared to the digital map data of the live map 105 in the cloud.

In one embodiment, in response to detecting a change, the mapping platform 107 can request additional information to verify that the change is true (e.g., collect additional sensor data, send out personnel to personally verify, etc.). If the mapping platform 107 determines that a detected change is a false positive, the campaign management platform 101 can create a change mask and transmit the change mask to vehicles 103 to suppress any additional false positives. If the detected change is verified or believed to have occurred, the mapping platform 107 can adjust the quality index of the digital map data accordingly. In addition, the campaign management platform 101 and/or mapping platform 107 can continue to request additional sensor observations of detected change until the new model or change reaches a confidence threshold to issue and publish a map update 109.

Figure 4B:
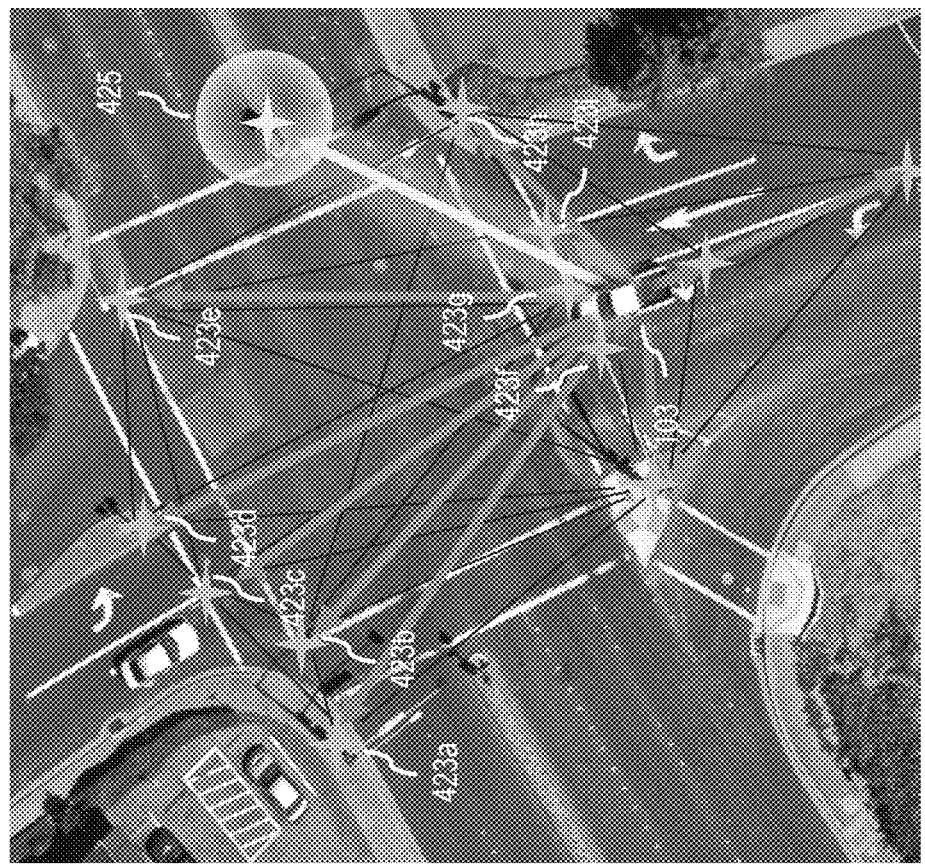
FIG. 4B is a diagram illustrating an example of change detection, according to one embodiment.

In one embodiment, the change detection can be performed as an in-vehicle process of a vehicle 103 and/or UE 111 based on determining that the vehicle 103 and/or UE 111 has access to an instance of the digital map data of the live map 105. FIG. 4B is a diagram illustrating an example 421 of an in-vehicle change detection, according to one embodiment. In one embodiment, to perform in-vehicle change detection, the vehicle 103 should have an onboard instance of the live map 105. The vehicle 103 can then receive change detection requests or other types of campaign requests that depend on change detection (e.g., validation requests or discovery requests). In some cases, the requests for certain types of changes may be masked in areas to prevent known false positives. The vehicle 103 can then collect sensor data for types specified in the sensor data requests (e.g., in the example of FIG. 4B, the requested data type is intersection lane markings). The vehicle 103 collects fused sensor observations (e.g., fusing GPS data with image data) to its copy of the digital map data to report changes per campaign requests. In the example of 4B, the vehicle 103 is able to match detected features 423a-423i (also collectively referred to as matched features 423) to the digital map so that there are no changes detected for these matched features 423. However, detected feature 425 is not matched to any known feature in the map data, and therefore is detected as a change.

In one embodiment, in-vehicle change detection can be combined with localization of sensor data to determine what data the vehicle 103 should transmit in response to campaign requests. If the vehicle 103 is unable to successfully localize, all observations (e.g., matched detected features 423) in the vicinity of the change (e.g., detected feature 425) can be transmitted to the cloud to learn the local constraints between observation. For a vehicle 103 to successfully localize, there should be enough observations to match to the digital map data. In one embodiment, if localization is successful, only the localized vehicle pose, map version, and detected changes (e.g., feature 425) are transmitted. By way of example, to process localized observations in the cloud, proxy localization features can be injected from the specified digital map data version when localization is performed. Localized changes are then ingested, the proxy features are discarded.

Figure 5:
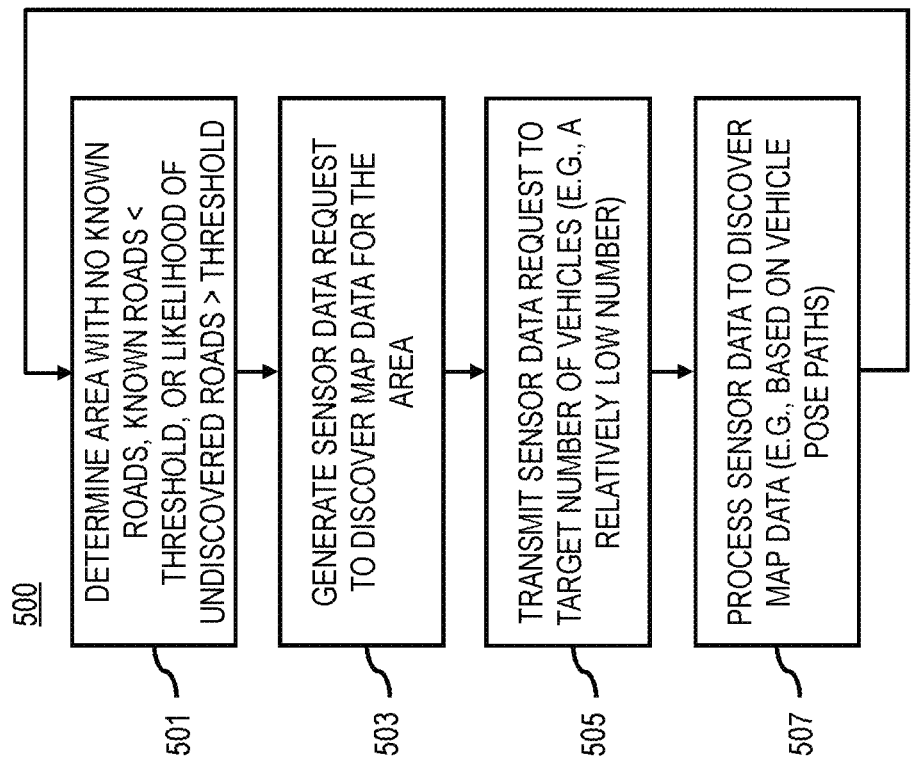
FIG. 5 is a flowchart of a process for using a campaign management platform to discover digital map data, according to one embodiment.

FIG. 5 is a flowchart of a process for using a campaign management platform to discover digital map data, according to one embodiment. In various embodiments, the campaign management platform 101 and/or any of the modules 201-207 may perform one or more portions of the process 500 and may be implemented in, for instance, a chip set including a processor and a memory as shown in FIG. 15. As such, the campaign management platform 101 and/or any of the modules 201-207 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, the process 500 provides for a "discovery" model of the campaign management platform 101 that can be used to create new map data for previously unmapped or undiscovered areas of the live map 105. It is contemplated that map discovery process 500 can be used as a standalone process or in combination with the "validation" model and/or "update".

In one embodiment, the map discovery process 500 can be summarized as follows. Discovery jobs or sensor data requests are used to target sensor data collection in areas with no known roadways. The map discovery process 500 is similar in some ways to the map validation process 300, but the geo-extents are carefully selected to focus on areas outside of the currently known road network. In one embodiment, a map discovery campaign is focused on identifying a pattern of driving within a new or previously unmapped geographic area. To this end, in one embodiment, sensor data requests issued under the discovery model may request only vehicle pose path or trajectory data (e.g., time-ordered sequence of location points associated with a drive by a single vehicle). Once a pattern of driving has been confirmed within the new area, then the campaign management platform 101 can launch an "update" campaign in order to acquire the data used by the map learning pipeline of the mapping platform 107 to map the new area.

In step 501, the discovery module 203 determines a geographic area with no known road segments represented in a geographic database, with a number of known road segments below a first threshold value, or with a likelihood of undiscovered road segments above a second threshold. For example, the discovery module 203 can define a bounded area in which there are no currently map road segments. In addition or alternatively, the discovery module 203 can define areas where there are fewer than a threshold value of road segments (e.g., areas with incomplete mapping). In another embodiment, the discovery module 203 can use the attributes or parameters such as no known road segments, comparability of the number of known segments to known or mapped geographic areas with similar attributes (e.g., location, rural/urban, size, etc.) to compute the likelihood that the geographic area can be classified as undiscovered versus mapped/known. If the likelihood is greater then an associated threshold value, then the discovery process can be initiated.

In step 503, the discovery module 203 generates a sensor data request specifying a sensor data collection event to be performed within the geographic area. As discussed above, the sensor data collection event can be part of a campaign to discover the digital map data for the geographic area. The sensor data requests can be constructed as described in the embodiments of the validation process 300 with exception that the target area is an unknown area instead of a known or previously mapped area. For example, the sensor data request can specify a polygon indicating the geographic area of interest, a sensor data type, a date range, a time range, the target number of vehicles, a vehicle qualifier, or a combination thereof.

In step 505, the discovery module 203 transmits the sensor data request to a plurality of vehicles, wherein the plurality of vehicles perform the sensor data collection event in the geographic area to collect sensor data. In one embodiment, the sensor data request is transmitted to plurality of vehicles through a manufacturer platform. The number vehicles to target can be based on the number vehicles in previous discovery campaigns in similar geographic areas. Similar areas, for instance, refers to areas with similar characteristics such as but not limited to rural versus urban, terrain features, similarity to neighboring known areas, etc. In one embodiment, the number of vehicles can be minimized to obtain a target amount of date within a target time period to minimize bandwidth and/or other resource usages requirements to conduct the discovery campaign.

Figure 6:
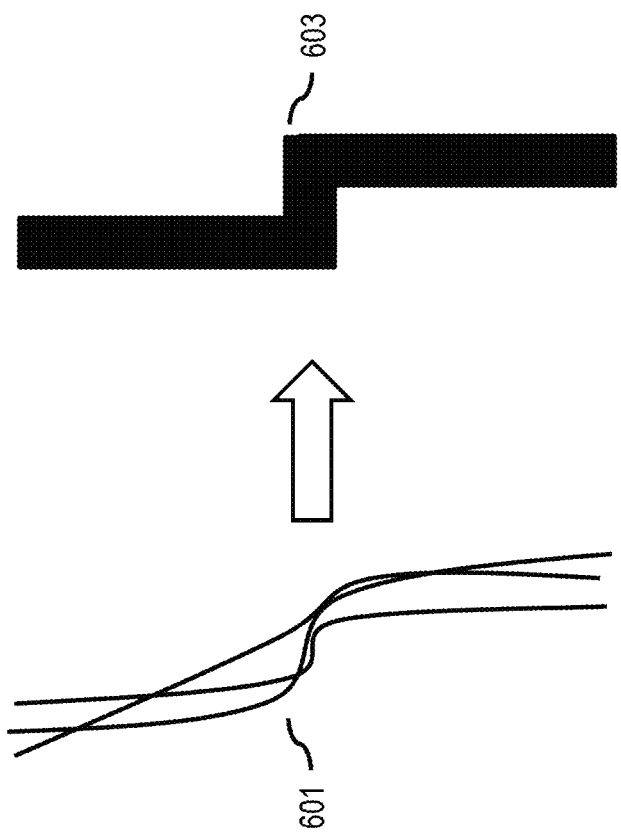
FIG. 6 is a diagram illustrating using vehicle pose path data to discover a road segment, according to one embodiment.

In step 507, the discovery module 203 processes the sensor data to generate the digital map data for the geographic area. In one embodiment, the sensor data request specifies collecting vehicle pose path data as the sensor data. Accordingly, the discovery module 203 processes the vehicle pose path data to identify a pattern of driving within the geographic area. At least some of the digital map data (e.g., candidate road segments in the area) can be determined from the pattern of driving. For example, FIG. 6 is a diagram illustrating using vehicle pose path data to discover a road segment, according to one embodiment. In the example of FIG. 6, the discovery module receives a set of vehicle pose paths 601 reported vehicles 103 participating in the discovery campaign. The discovery module 203 can then process the set of vehicle pose paths 601 (e.g., by clustering or equivalent means) to determine the contours of a road segment 603. The discovery module 203 is configured to assume that if a target number of vehicles 103 drives along the same path through an unknown area, it is likely that the path will correspond to a road segment or other path that supports vehicular travel. The discovery module 203 can specify the target number of vehicle pose paths to obtain in the set 601 to achieve a target confidence that set of vehicles pose paths or trajectories 601 correspond to a new or previously unmapped road segment (e.g., with confidence increasing with higher numbers of observed paths).

The discovery module 203 then confirms the pattern of driving as corresponding to a road segment within the geographic area. For example, the candidate road segment can be confirmed by collecting additional sensor data, sending personnel to manually verify, compare to crowdsourced observations, etc. In one embodiment, after identifying and/or confirming the newly detected road segment, the campaign management platform 101 can initiate additional campaigns to gather data on other sensor data types in the area (e.g., lane markings, signs, poles, traffic signals, etc.). In other words, the discovery module 203 can initiate an update campaign to collect additional sensor for the road segment, the geographic area, or a combination thereof based on the confirming of the pattern of driving or corresponding road segment to generate map data.

Figure 7:
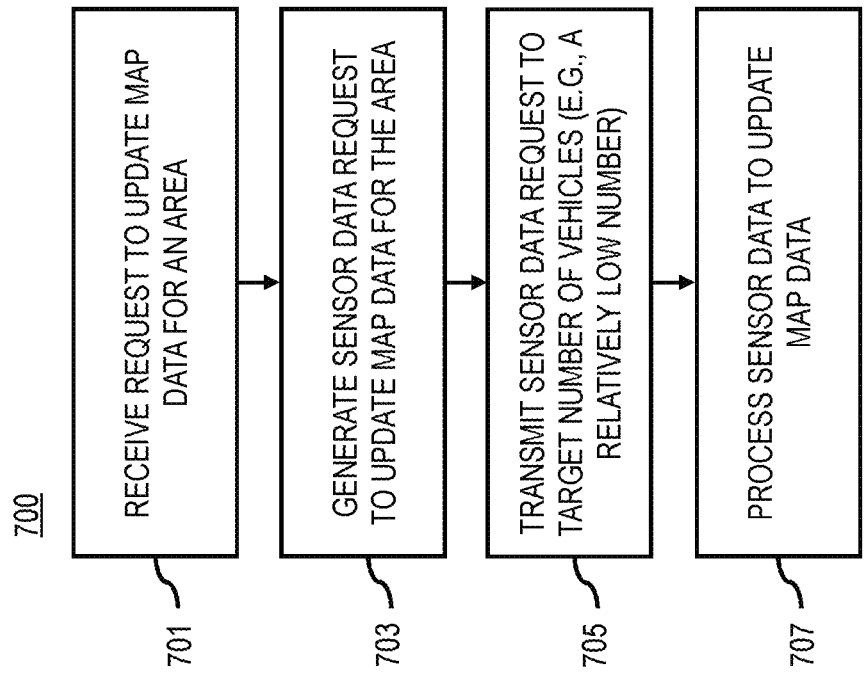
FIG. 7 is a flowchart of a process for using a campaign management platform to update digital map data, according to one embodiment.

FIG. 7 is a flowchart of a process for using a campaign management platform to update digital map data, according to one embodiment. In various embodiments, the campaign management platform 101 and/or any of the modules 201-207 may perform one or more portions of the process 700 and may be implemented in, for instance, a chip set including a processor and a memory as shown in FIG. 15. As such, the campaign management platform 101 and/or any of the modules 201-207 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

In one embodiment, the process 700 provides for an "update" model of the campaign management platform 101 that can be used to update existing or new newly created map data of the live map 105. It is contemplated that map validation process 700 can be used as a standalone process or in combination with the "validation" model and/or "discovery" model.

In one embodiment, the map update process 700 can be summarized as follows. Update requests specifically collect the sensor data used by the map learning pipeline of the mapping platform 107 to update the digital map data of the live map 105. In one embodiment, the identification of geographic areas for a map update campaign can accomplished by previously run validation and/or discovery campaigns, as well as another condition or input for triggering a map update (e.g., requested by an administrator, data reaches a freshness threshold, etc.). The number of vehicles requested to collect sensor data in an update campaign, for instance, can be increased relative to the number of vehicles required for validation and/or discovery campaigns, in order to obtain a sufficient amount of data for the map learning pipeline of the mapping platform 107 to update the map. In one embodiment, the depth and breadth of data that the update campaign requests individual vehicles 103 to collect may also be increased relative to sensor data requests issued under the validation and/or discovery models. Once a designated amount of sensor data has been collected, the campaign management platform 101 can issue a cancellation of the request.

In step 701, the update module 205 receives a map update request to update the digital map data for a geographic area. In one embodiment, the map update request is received from the validation module 201 based on the validation module 201 detecting a change in the digital map data. For example, the change detection can be performed in the cloud or in-vehicle as discussed with respect to the embodiments of map validation process 300. In another embodiment, the map update request is received from the discovery module 203 based on the discovery module 203 detecting and/or confirming a new road segment in the geographic area according to embodiments map discovery process 500.

In step 703, the update module 205 generates a sensor data request specifying a sensor data collection event to be performed within the geographic area with the sensor data collection event is part of a campaign to update the digital map for the geographic area. The update module 305 can use a process equivalent or similar to the request generation processes of described in embodiments of the validation and/or discovery processes 300 and 500 above. In one embodiment, a depth and/or breadth of the sensor data requested in the sensor data request can based on or determined from the respective depth and/or breadth of other sensor data used by the validation module to validate digital map data, the discovery module to generate digital map data, or a combination thereof. For example, the depth and/or the breadth, or a combination thereof of the sensor data can be increased relative the validation module and/or discovery module.

In one embodiment, the depth can refer to the number or amount of sensor data observations that to be collected by participating vehicles 103 so that the number of observations or amount of sensor data is increased relative to comparable validation and/or discovery campaigns. To increase the depth, the update module 205, for instance, can specify a longer campaign, extend the time ranges for collecting sensor, and/or the like. In one embodiment, the breadth of the sensor data can refer to the number of sensor data types designated in the sensor data request. For example, if a validation campaign detects a change in one sensor data type (e.g., lane marking), the update module 205 can increase the breadth of the corresponding update campaign by collecting multiple types of sensor data (e.g., lane markings in combination with road signs, traffic signals, poles, etc.).

In step 705 the update module 205 transmits the sensor data request to a target number of vehicles, wherein the target number of vehicles perform the sensor data collection event in the geographic area to collect sensor data. In one embodiment, the target number of vehicles can be increased relative to the respective number of vehicles used by the validation module, the discovery module, or a combination thereof. More specifically, the target number of vehicles can be determined based on a respective number of vehicles used by the validation module 201 to validate the digital map data and/or the discovery module 203 to generate the digital map data. This increased number of participating can be used to complete a campaign faster or to increase the depth of amount of collected data if the campaign duration is kept the same. In one embodiment, the update module 205 transmits a cancellation request to the target number of vehicles based on determining that a target amount of the sensor data has been collected, wherein the cancellation request cancels the sensor data collection event.

In step 707, the update module 205 processes the sensor data to update the digital map data for the geographic area. For example, the update module 205 alone or in combination with the mapping platform 101 can detect any changes indicated in the collected sensor and then aggregate those changes in to a map update once a level confidence associated with the detected range reaches a threshold confidence.

Figure 8:
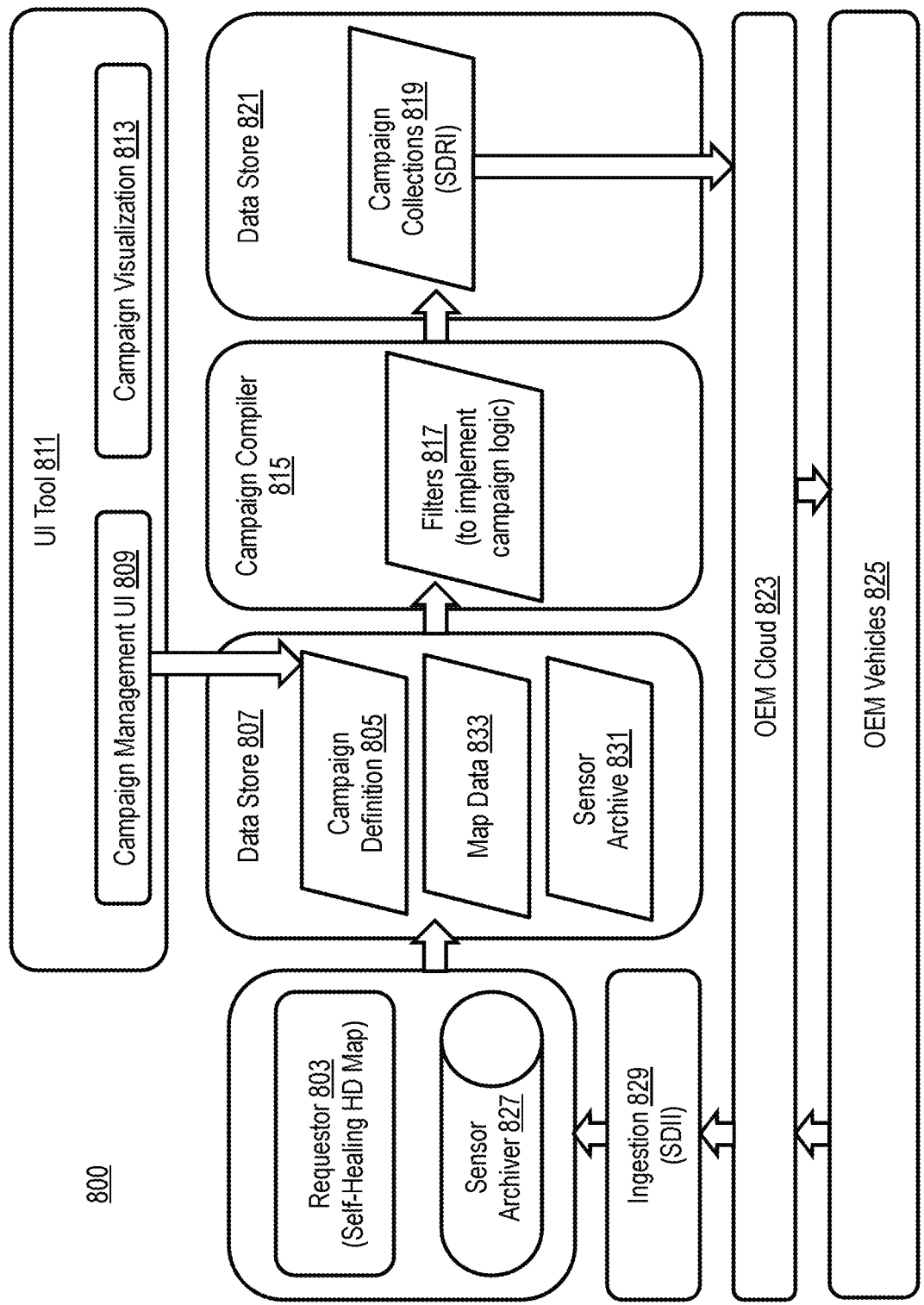
FIG. 8 is a diagram illustrating an example workflow of a campaign management platform, according to one embodiment.

FIG. 8 is a diagram illustrating an example workflow 801 of the campaign management platform 101, according to one embodiment. As shown, a requestor 803 (e.g., an administrator of a self-healing HD map such as the live map 105) can submit campaign definitions 805 (e.g., campaign type—validation/discovery/update—and related parameters, sensor data requests, etc.) to the data store catalog 807 via a campaign management UI 809 of a UI tool 811 of the campaign management platform 101. The UI tool 811 can also include a campaign visualization 813 for presenting campaign requests, status, collected sensor data, and/or other related data in a user interface (e.g., UI 401 of FIG. 4A).

The requestor 801 then adds campaign compilation logic to a campaign compiler 815 though one or more batch filters 817 that can perform campaign related operation on campaign definitions (e.g., validations, logging, tile-based aggregations, etc.).

In one embodiment, the output of the campaign compiler 815 is routed to a campaign collection layer 819, which is a data store catalog layer 821 that holds a collection of campaigns. The collection, for instance, can be designated to a specific OEM. The OEM can use its corresponding OEM cloud platform 823 to poll the campaign collection layer 819 for new or changed campaigns. In one embodiment, the OEM cloud platform 823 could also subscribe to receive change notifications for news of changed campaigns. The OEM cloud platform 825 extracts new/changed campaigns from the data store catalog 821 and proxies the request to target vehicles (e.g., OEM vehicles 825).

The OEM vehicles 825 can then collect sensor data in response to campaign requests and returns the sensor data to the OEM cloud platform 823. The OEM cloud platform 823 can relay the sensor data to the sensor archiver 827 associated with the requestor 801 through the ingestion interface 829 (e.g., SDII). The sensor data can then be further routed to the sensor archive 831 of the data store catalog 807 to generate or maintain map data 833.

Figure 9:
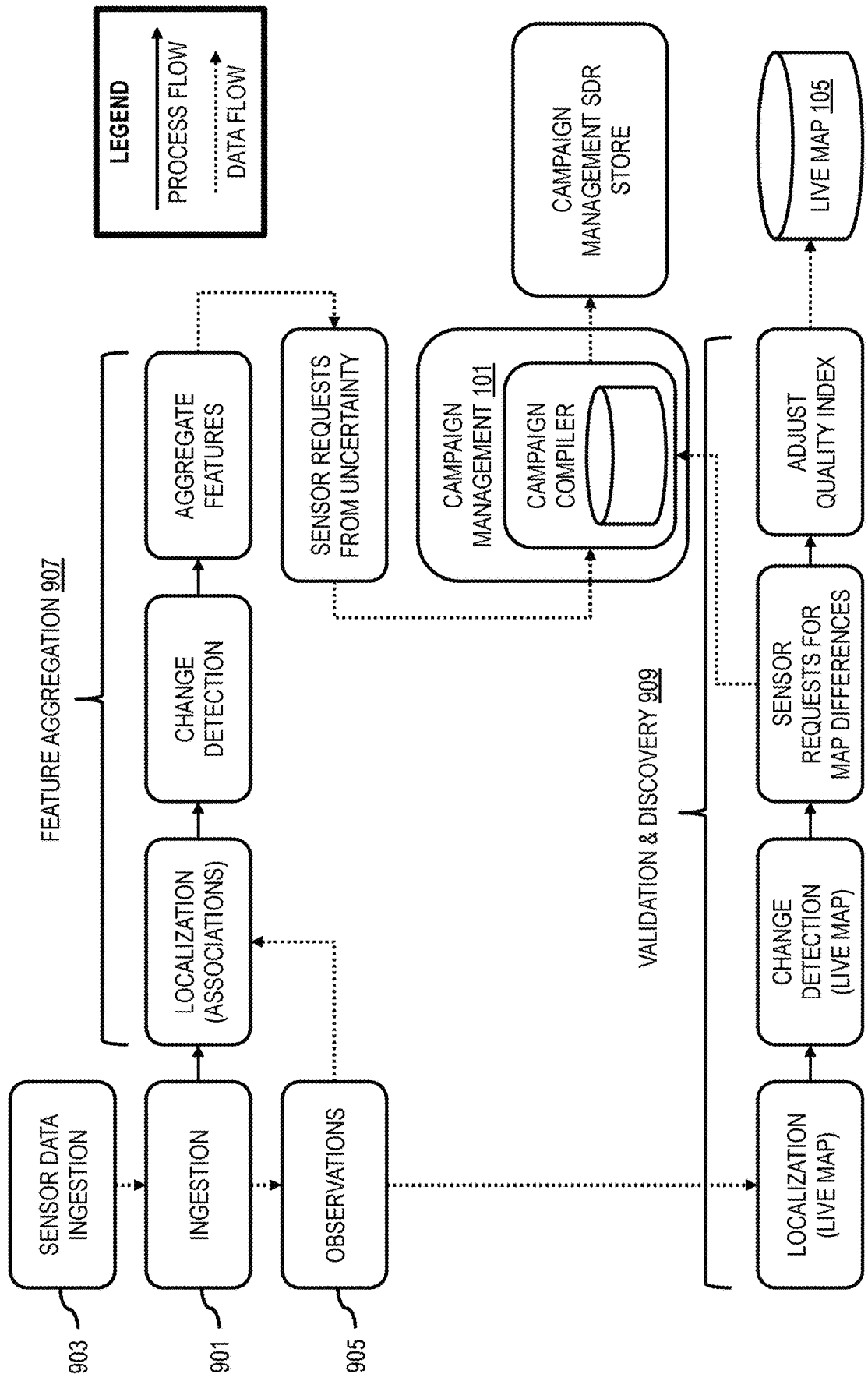
FIG. 9 is a diagram illustrating components of a self-healing digital map, according to one embodiment.

In the example of FIG. 8, the requestor 801 is self-healing map. FIG. 9 is a diagram illustrating example components of a self-healing digital map and their interactions with the campaign management platform 101, according to one embodiment. As shown, the components of a self-healing digital map platform (e.g., mapping platform 107) includes an ingestion module 901 for collecting sensor data reported from vehicles 103 (e.g, via sensor data ingestion 903) for storage in a sensor observations database 905.

The collected sensor observations 905 can then be routed to various map learning pipeline process including but not limited to a feature aggregation process 907 and validation and discovery process 909 of the campaign management platform 101. The feature aggregation process 907 can process the observations 905 to localize detected features, detect feature changes, and aggregate features to determine map features for possible map updates. If the detected features have an uncertainty above a threshold, the feature aggregation process 907 can request a sensor data collection campaign to collect additional data to reduce uncertainty.

After the feature aggregation process 907 have sufficient data to lower the uncertainty of the changed map features to below target levels, the map learning pipeline can use the output of the processes 905 and 907 to generate map updates.

Figure 10:
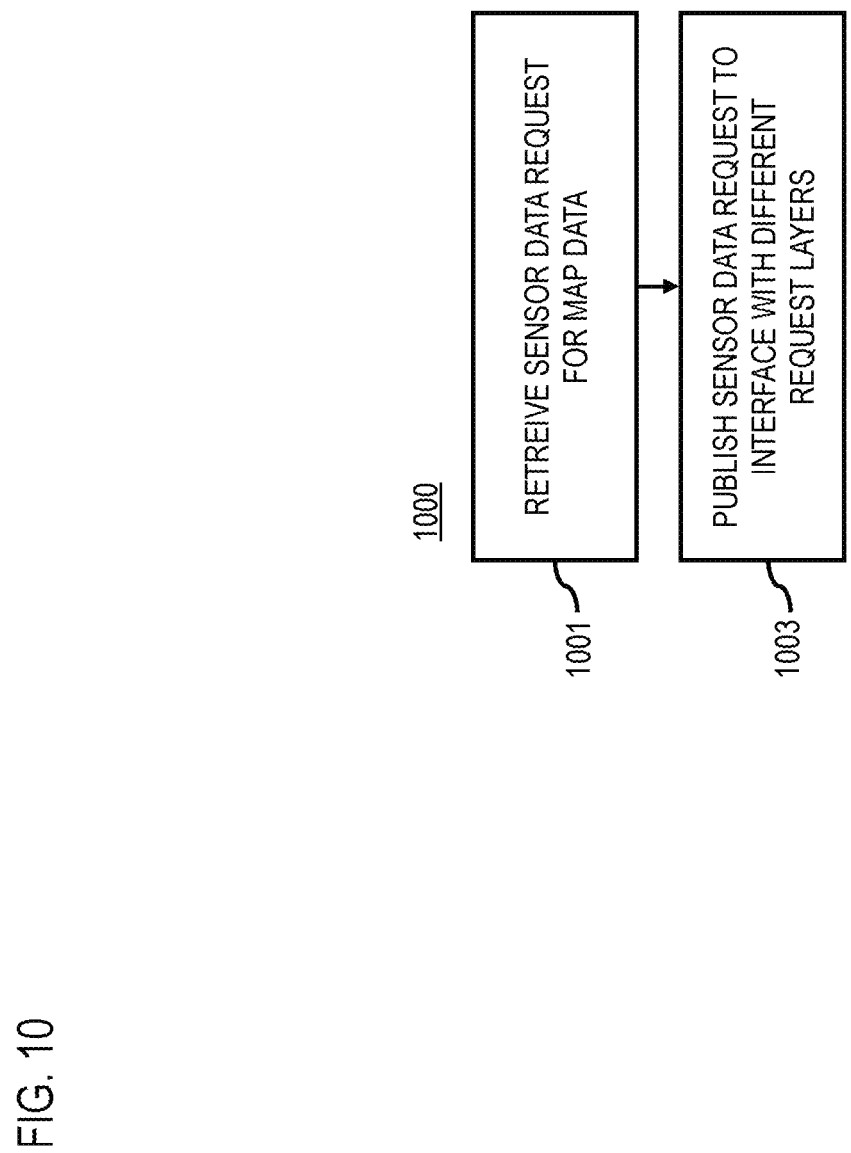
FIG. 10 is a flowchart of a process for creating an interface for a campaign management platform to transmit sensor data requests, according to one embodiment.
Figure 11:
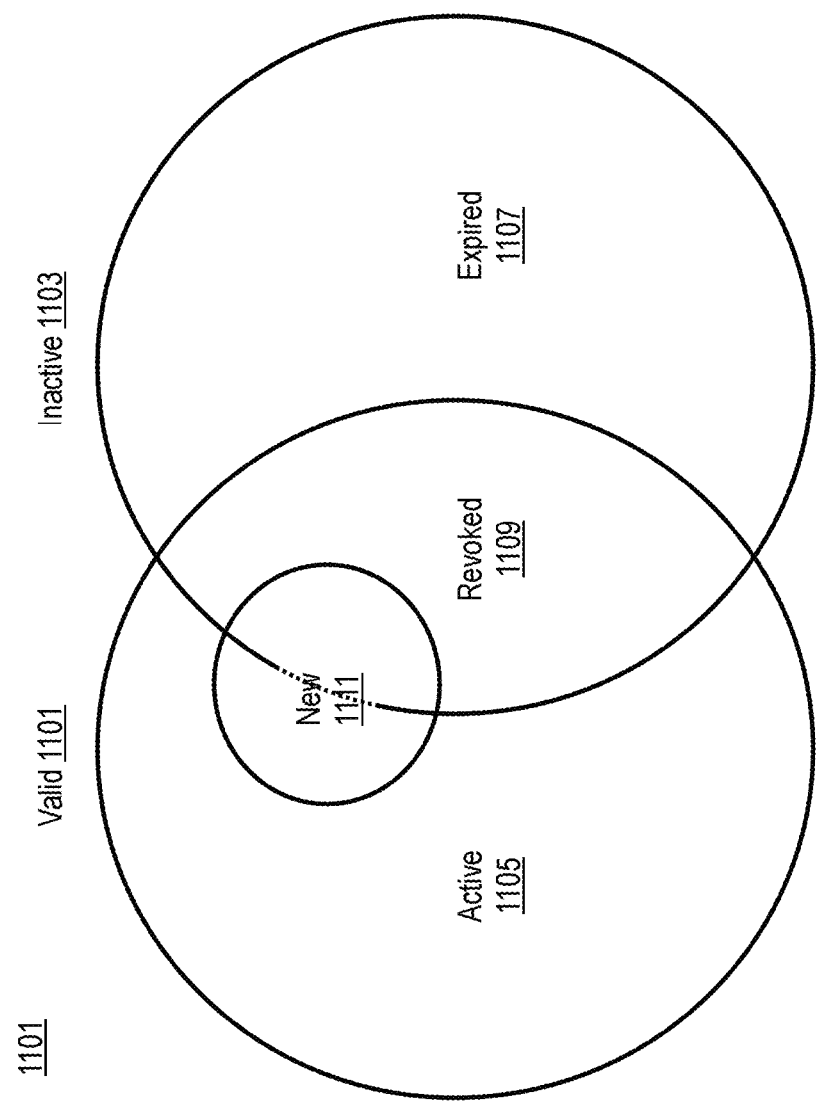
FIG. 11 is a diagram illustrating different status of sensor data requests published to a sensor data request interface, according to one embodiment.

FIG. 10 is a flowchart of a process for creating an interface for a campaign management platform to deliver sensor data requests, according to one embodiment. In various embodiments, the campaign management platform 101 and/or any of the modules 201-207 may perform one or more portions of the process 700 and may be implemented in, for instance, a chip set including a processor and a memory as shown in FIG. 17. As such, the campaign management platform 101 and/or any of the modules 201-207 can provide means for accomplishing various parts of the process 1000, as well as means for accomplishing embodiments of other processes described herein in conjunction with other components of the system 100. Although the process 1000 is illustrated and described as a sequence of steps, its contemplated that various embodiments of the process 1000 may be performed in any order or combination and need not include all of the illustrated steps.

In the embodiments of the validation, discovery, and update models described above, the campaign management platform 101 delivers campaign sensor data requests to target vehicles. In one embodiment, the campaign management platform 101 can use the process 1000 to create a layered external facing interface for vehicles 103 and/or the OEM platform 117 to access these requests to participate in the data collection events of the campaigns.

In step 1001, the campaign management platform 101 (e.g., via the validation module 201, the discovery module 203, and/or the update module 205) retrieves sensor data requests specifying a sensor data collection event to be performed on a road segment, a geographic area, or a combination thereof. In one embodiment, the sensor data requests can be for any purpose where such data is needed including but not limited to discovery, validation, update, or a combination thereof of digital map data (e.g., of the live map 105) for the road segment, the geographic area, or a combination thereof. These requests can be retrieved and/or generated according to embodiments of the validation process 300, discovery process 500, and update process 700 described above.

In step 1030, the interface module 207 publishes or transmits the sensor data request to a campaign management interface. In one embodiment, the interface comprises a plurality of layers including an active request layer, a newly published request layer, a revoked request layer, or a combination thereof. Vehicles and/or a corresponding manufacturer platform (e.g., OEM platform 117) can access at least one of the plurality of layers to fulfill the sensor data request. In one embodiment, the access can be provided by via a stream subscription, by a data pulling mechanism, or any equivalent mechanism.

In one embodiment, the different layers of the interface can be based on the different status of sensor data requests generated and processed by the campaign management platform. For example, as shown the diagram 1101 of FIG. 11, these different layers can be based on the status of the sensor data request. In one embodiment, the main status can classify a sensor data request as either Active or Inactive. For an active sensor data request, sensor data collection is requested. For an inactive sensor data request, sensor data collection is not requested. In addition, a sensor data request can have further sub status of New or Revoked. A new sub status indicates that the sensor data request is newly published within a most recent time epoch (e.g., most recent 24-hour period). The revoked sub status indicates that a sensor data request has been make inactive before its designated expiration time. In one embodiment, yet another sub status can include a validity status. A valid sensor data request has not expired due to time and is valid based on its designated time ranges; and sensor data collection is requested. An invalid sensor data has a time validity that has expired based on the designated time range and, no more sensor data collection is needed.

The different layers of the campaign interface can then be determined based on these different status and sub status of the sensor requests. For example, the active request layer presents a plurality of sensor data requests that are active and waiting for fulfilling (e.g., waiting for data collection to satisfy the requests). The newly published request layer presents a plurality of sensor data requests that have been published to the interface since a previous publishing event (e.g., the last time the request layer was previously published), within a most recent time epoch, or a combination thereof. In one embodiment, the sensor data requests that are presented in the newly published layer are concurrently presented in the active request layer (e.g., for the last publishing period).

In one embodiment, the revoked request layer presents sensor data requests that have been revoked before an end of the validity period of the sensor data requests. As noted above, the revoked request layer can include sensor data requests that have become inactive before their designation expiration time. In other embodiments, the revoked request layer can also include sensor data requests that are revoked before any other expiration condition including but not limited to the time-based expiration.

In one embodiment, requests can be moved between layers of the interface based on their respective statuses. For example, a revoked sensor data request can be moved from the revoked request layer to the active layer of the interface based on determining the revoked sensor data meets a criterion for being valid or based on a reversed order. In one embodiment, sensor data requests can be moved between layers based on a designated time cadence corresponding, for instance, to a publishing period. For example, a new version of one or more output layers of the interface is created based on the designated time cadence and then moved to the appropriate layer based on its status or sub status.

Figure 12:
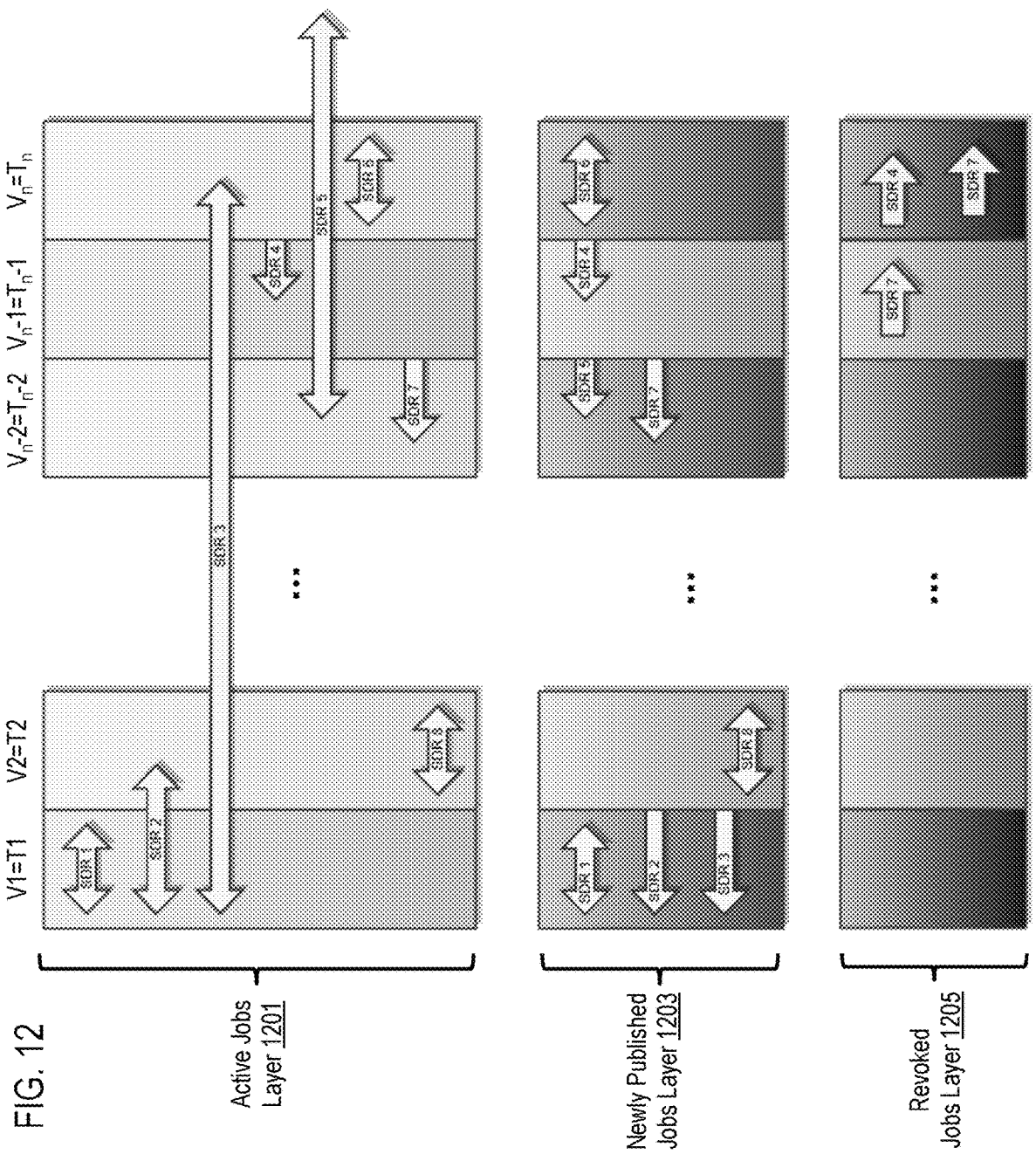
FIG. 12 is a diagram illustrating example layers of a sensor data request interface, according to one embodiment.

FIG. 12 is a diagram illustrating example layers a sensor data request interface, according to one embodiment. More specifically, the example of FIG. 12 illustrates how sensor data requests are included or moved between the layers (e.g., active jobs layer 1201, newly published layer 1203, and revoked jobs layer 1205) over different time periods designated $V_1$ to $V_n$ (e.g., denoting different versions) corresponding respectively time epochs $T_1$ to $T_n$. The movement is summarized in Table 1 below for sensor data requests (SDRs) 1 to 8.

TABLE 1

| | $V_1$ | $V_2$ | $V_n-2$ | $V_n-1$ | $V_n$ |
|---|---|---|---|---|---|
| Active Layer 1201 | SDR1, SDR2, SDR3 | SDR2, SDR3, SDR8 | SDR3, SDR5, SDR7 | SDR3, SDR4, SDR5 | SDR3, SDR5, SDR6 |
| New Layer 1203 | SDR1, SDR2, SDR3 | SDR8 | SDR5, SDR7 | SDR4 | SDR6 |
| Revoked Layer 1205 | | | | SDR7 | SDR4, SDR7 |
| Comments | Initial version of all SDRs are new. | Only SDR8 is new, but others are still active, and SDR1 is expired. | SDR2 and SDR8 are inactive because they expired. | SDR4 is new, SDR7 is revoked, and all others remain active. | SDR4 and SDR 7 are revoked, SDR 6 is new. Revocation is present until the request is valid. |

In one embodiment, a new version of the sensor data request is created once per publishing period which is defined by the publishing rate (i.e., the time cadence). If there is no new sensor data request or revocation, a new version can be skipped until a new sensor data request or revocation appears. The width (time covered or time epoch) by a version depends on a designated time cadence (e.g., a 24-hour time cadence). This cadence or time epoch width also defines the resolution of the system 100.

In one embodiment, the sensor data requests in the plurality of layers of the interface are geographically partitioned (e.g., according to a map tile structure and/or volume of sensor data requests). For example, the system 100 can choose a tile zoom level (e.g., zoom level 10) as the default. However, the zoom level can be changed based on the sensor data collected and/or success or failure of the campaign management platform 101 to fulfil campaign requests. In one embodiment, the zoom lives or geographic partitioning structure can vary from layer to layer. Each version of a layer contains data only when there is relevant data otherwise no partition is published.

Returning to FIG. 1, in one embodiment, the mapping platform 107 and/or campaign management platform 101 may be platforms with multiple interconnected components. For example, the mapping platform 107 and/or campaign management platform 101 may include multiple servers, intelligent networking devices, computing devices, components and corresponding software for providing map validation, discovery, and/or update campaigns and a corresponding campaign management interface for external access.

By way of example, the UE 111 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 111 can support any type of interface to the user (such as "wearable" circuitry, etc.). In one embodiment, the UE 111 may be associated with the vehicle 103 or be a component part of the vehicle 103.

In one embodiment, the vehicle 103 can support various driving modes (e.g., autonomous mode, semi-autonomous, manual, etc.). The vehicle 103, for instance, can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

- Level 0 (No-Automation)—"The driver is in complete and sole control of the primary vehicle controls—brake, steering, throttle, and motive power—at all times.";
- Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";
- Level 2 (Combined Function Automation)—"This level involves automation of at least two primary control functions designed to work in unison to relieve the driver of control of those functions. An example of combined functions enabling a Level 2 system is adaptive cruise control in combination with lane centering.";
- Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and
- Level 4 (Full Self-Driving Automation)—"The vehicle is designed to perform all safety-critical driving functions and monitor roadway conditions for an entire trip. Such a design anticipates that the driver will provide destination or navigation input but is not expected to be available for control at any time during the trip. This includes both occupied and unoccupied vehicles."

The various embodiments described herein are applicable to vehicles that are classified in any of the levels of automation (levels 0-4) discussed above.

In one embodiment, the vehicle 103 is configured with various sensors for generating or collecting sensor data, vehicular sensor data, related geographic/map data, etc. For example, in response to sensor data requests, the vehicles 103 can use the various sensors to collect probe or probe trajectory data comprising a time-stamped sequence of sensed geo-coordinates from which drive paths can be determined. Other example of sensor data to collect include but is not limited to detected road signs, lane markings, traffic signals, and/or other detected map features that can be indicated as location points corresponding to their detected locations. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for detecting physical dividers according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 103 may detect the relative distance of the vehicle from a VRU, a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the campaign management platform 101, mapping platform 107, OEM platform 117, vehicle 103, and/or UE 111 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 13:
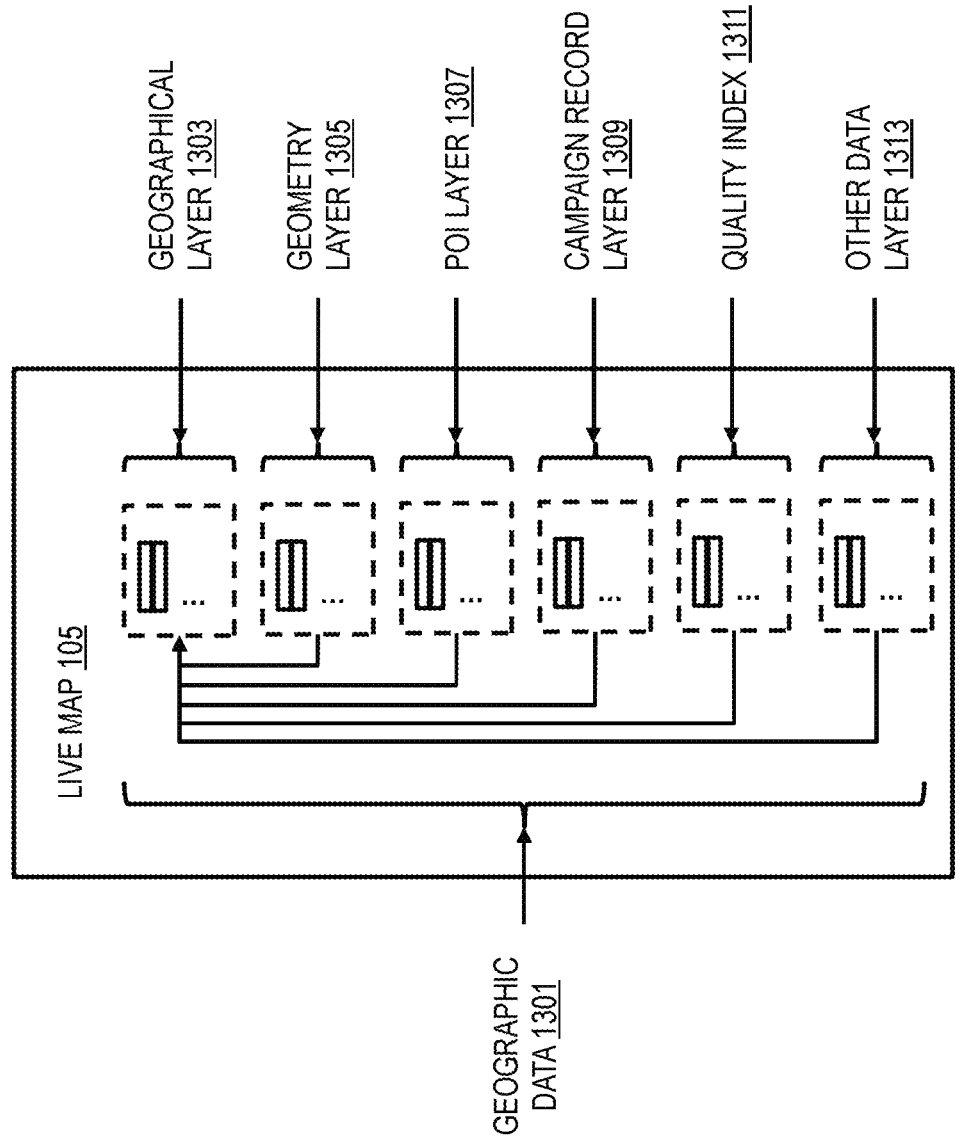
FIG. 13 is a diagram of a live map, according to one embodiment.

FIG. 13 is a diagram of a live map 105 (e.g., a geographic database), according to one embodiment. In one embodiment, the live map 105 includes geographic data 1301 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the live map 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the live map 105 follows certain conventions. For example, links do not cross themselves and do not cross each other except at a node. Also, there are no duplicated shape points, nodes, or links. Two links that connect each other have a common node. In the live map 105, overlapping geographic features are represented by overlapping polygons. When polygons overlap, the boundary of one polygon crosses the boundary of the other polygon. In the live map 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the live map 105 includes: (1) a geographical layer 1301 for defining nodes, road segments, the connections between them, and additional attributes; (2) a geometry layer 1305 for defining geometrical shapes of the map features like roads, terrain features, geographical boundaries, etc.; (3) a POI layer 1307; (4) a campaign record layer 1309; (5) a quality index 1311; and other layer 1313, for example. More, fewer or different data layers can be provided. In one embodiment, additional data layers (not shown) can include cartographic ("carto") data records, routing data, and maneuver data.

In exemplary embodiments, the geographical layer 1303 can include road segment data records which store data on links or segments representing roads, streets, or paths. This data can be used in the calculated route or recorded route information for determination of one or more personalized routes. The geographical layer 1303 can also include node data records that store end points corresponding to the respective links or segments of the road segment data records 1305. The road link data records and the node data records represent a road network, such as used by vehicles, cars, and/or other entities. Alternatively, the live map 105 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The live map 105 can include data about the POIs and their respective locations in the POI layer 1307. The live map 105 can also include data about places, such as cities, towns, or other communities, and other geographic features, such as bodies of water, mountain ranges, etc. Such place or feature data can be part of the POI layer 1307 or can be associated with POI data records (such as a data point used for displaying or representing a position of a city).

In one embodiment, the live map 105 can also include campaign data records 1309 for storing sensor campaign definition parameters, sensor data requests, collective sensor data, and/or any other related data (e.g., change detections, detected map features, etc.). In one embodiment, the campaign data records 1309 can be associated with segments of a road link or designated geographic areas. In one embodiment, the campaign data records 1309 can be associated with one or more of the node records, road segment records of the geographical layer 1303 and/or geometry layer 305 or portions thereof (e.g., smaller or different segments than indicated in the road segment records, individual lanes of the road segments, etc.) to provide management of campaigns to validate, discover, and/or update map data. In this way, the campaigns associated with campaign data records 1309 can also be associated with the characteristics or metadata of the corresponding geographical layer 1303.

In one embodiment, the live map 105 can be maintained by the content provider (e.g., a map developer). The map developer can collect geographic data to generate and enhance the live map 105. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the live map 105 include high resolution or high definition (HD) mapping data that provide centimeter-level or better accuracy of map features. For example, the live map 105 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the live map 105 is stored as a hierarchical or multi-level tile-based projection or structure. More specifically, in one embodiment, the live map 105 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The live map 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a map data campaign management platform may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
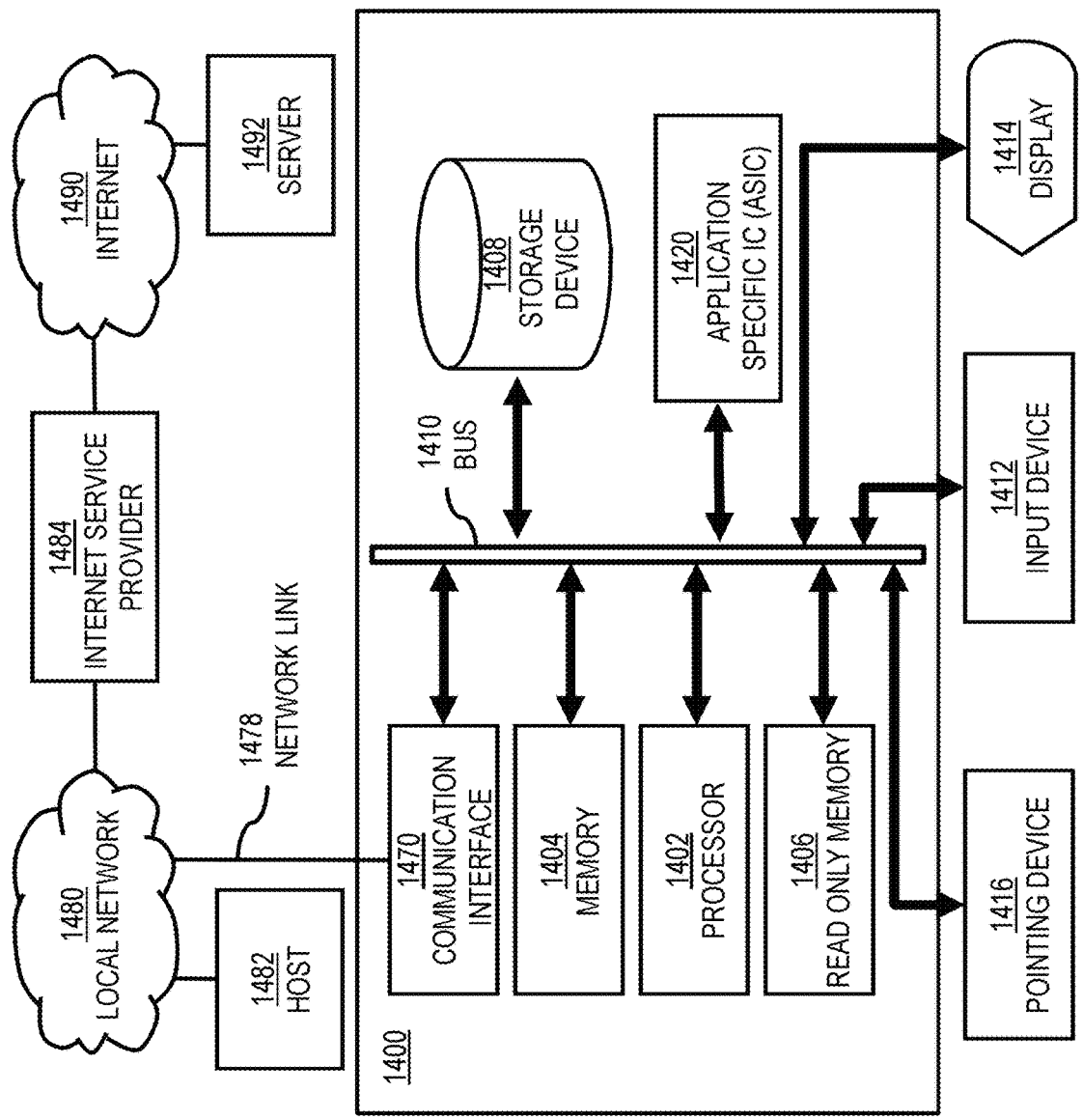
FIG. 14 is a diagram of hardware that can be used to implement an embodiment.

FIG. 14 illustrates a computer system 1400 upon which an embodiment of the invention may be implemented. Computer system 1400 is programmed (e.g., via computer program code or instructions) to provide a map data campaign management platform as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to providing a map data campaign management platform. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for providing a map data campaign management platform. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for providing a map data campaign management platform, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 113 for providing a map data campaign management platform.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 15 illustrates a chip set 1500 upon which an embodiment of the invention may be implemented. Chip set 1500 is programmed to provide a map data campaign management platform as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to provide a map data campaign management platform. The memory 1505 also stores the data associated with or generated by the execution of the inventive steps.

Figure 16:
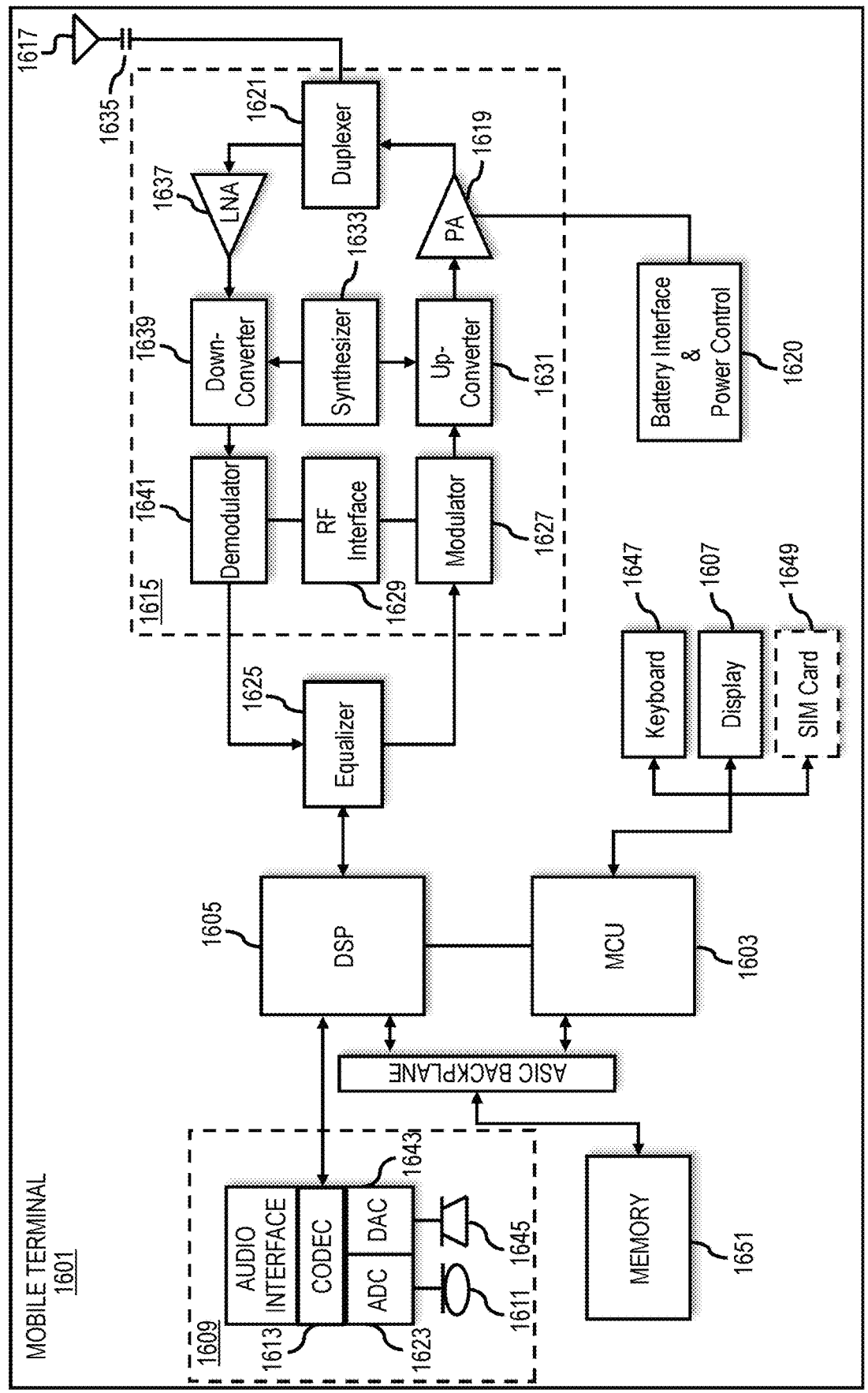
FIG. 16 is a diagram of a mobile terminal (e.g., handset or vehicle or part thereof) that can be used to implement an embodiment.

FIG. 16 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to provide a map data campaign management platform. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1651 may be, but not limited to, a single memory, CD, DVD, ROM, RAM, EEPROM, optical storage, or any other non-volatile or non-transitory storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for creating an interface for a campaign management platform to deliver a sensor data request for digital map data comprising:
   retrieving, by the campaign management platform, the sensor data request specifying a sensor data collection event to be performed on a road segment, a geographic area, or a combination thereof; and
   publishing the sensor data request to the interface,
   wherein the interface comprises a plurality of layers including an active request layer, a newly published request layer, a revoked request layer, or a combination thereof; and
   wherein a plurality of vehicles, a manufacturer platform associated with the plurality of vehicles, or a combination thereof accesses at least one of the plurality of layers to fulfill the sensor data request.

2. The method of claim 1, wherein the active request layer presents a plurality of sensor data requests that are active and waiting for fulfilling.

3. The method of claim 1, wherein the newly published request layer presents a plurality of sensor data requests that have been published to the interface since a previous publishing event, within a most recent time epoch, or a combination thereof.

4. The method of claim 1, wherein the revoked request layer presents a plurality of sensor data requests that have been revoked before an end of a validity period of the plurality of sensor data requests.

5. The method of claim 1, wherein a plurality of sensor data requests that are presented in the newly published layer are concurrently presented in the active request layer for a last publishing period.

6. The method of claim 1, wherein a plurality of sensor data requests in the revoked request layer is revoked before an expiration time, expiration condition, or a combination thereof.

7. The method of claim 1, wherein a revoked sensor data request is moved from the revoked request layer to the active layer of the interface based on determining the revoked sensor data meets a criterion for being valid or based on a reversed order.

8. The method of claim 1, wherein the sensor data request is moved between the plurality of layers based on a publishing period.

9. The method of claim 8, wherein a new version of one or more output layers is created based on the designated time cadence.

10. The method of claim 1, wherein the plurality of layers is partitioned according to a map tile structure, volume of the sensor data request, or a combination thereof.

11. The method of claim 10, wherein the map tile structure varies in zoom level between the plurality of layers.

12. The method of claim 1, wherein the plurality of vehicles, the manufacturer platform, or a combination thereof accesses said at least one of the plurality of layers via a stream subscription, via a data pulling process, or a combination thereof.

13. An apparatus for creating an interface for a campaign management platform to transmit a sensor data request for digital map data comprising:
  at least one processor; and
  at least one memory including computer program code for one or more programs,
  the at least one memory and the computer program code configured to, with the at least one processor, cause the apparatus to perform at least the following, comprising:
    retrieve, by the campaign management platform, the sensor data request specifying a sensor data collection event to be performed on a road segment, a geographic area, or a combination thereof; and
    publish the sensor data request to the interface,
    wherein the interface comprises a plurality of layers including an active request layer, a newly published request layer, a revoked request layer, or a combination thereof; and
    wherein a plurality of vehicles, a manufacturer platform associated with the plurality of vehicles, or a combination thereof accesses at least one of the plurality of layers to fulfill the sensor data request.

14. The apparatus of claim 13, wherein the active request layer presents a plurality of sensor data requests that are active and waiting for fulfilling.

15. The apparatus of claim 13, wherein the newly published request layer presents a plurality of sensor data requests that have been published to the interface since a previous publishing event, within a most recent time epoch, or a combination thereof.

16. The apparatus of claim 13, wherein the revoked request layer presents a plurality of sensor data requests that have been revoked before an end of a validity period of the plurality of sensor data requests.

17. A non-transitory computer-readable storage medium for creating an interface for a campaign management platform to transmit a sensor data request for digital map data, carrying one or more sequences of one or more instructions which, when executed by one or more processors, cause an apparatus to perform:
  retrieving, by the campaign management platform, the sensor data request specifying a sensor data collection event to be performed on a road segment, a geographic area, or a combination thereof; and
  publishing the sensor data request to the interface,
  wherein the interface comprises a plurality of layers including an active request layer, a newly published request layer, a revoked request layer, or a combination thereof; and
  wherein a plurality of vehicles, a manufacturer platform associated with the plurality of vehicles, or a combination thereof accesses at least one of the plurality of layers to fulfill the sensor data request.

18. The non-transitory computer-readable storage medium of claim 17, wherein the active request layer presents a plurality of sensor data requests that are active and waiting for fulfilling.

19. The non-transitory computer-readable storage medium of claim 17, wherein the newly published request layer presents a plurality of sensor data requests that have been published to the interface since a previous publishing event, within a most recent time epoch, or a combination thereof.

20. The non-transitory computer-readable storage medium of claim 17, wherein the revoked request layer presents a plurality of sensor data requests that have been revoked before an end of a validity period of the plurality of sensor data requests.

* * * * *